United States Patent [19]

Kawamura et al.

[11] Patent Number: 4,697,899

[45] Date of Patent: Oct. 6, 1987

[54] MOTORIZED DRIVE DEVICE FOR CAMERA

[75] Inventors: Masaharu Kawamura, Kawasaki; Yoshihito Harada, Yokohama; Ryuichi Kobayashi, Kawasaki; Masayuki Suzuki, Yokohama; Tsunemasa Ohara; Yoichi Tosaka, both of Tokyo, all of Japan

[73] Assignee: Canon Kabushiki Kaisha, Tokyo, Japan

[21] Appl. No.: 913,137

[22] Filed: Sep. 29, 1986

[30] Foreign Application Priority Data

Oct. 3, 1985 [JP] Japan .............................. 60-219121
Oct. 3, 1985 [JP] Japan .............................. 60-219122
Oct. 16, 1985 [JP] Japan .............................. 60-228944

[51] Int. Cl.⁴ .............................................. G03B 1/12
[52] U.S. Cl. ............................................... 354/173.11
[58] Field of Search ......................... 354/173.1, 173.11

[56] References Cited

U.S. PATENT DOCUMENTS 4,455,075  1/1984  Iwashita et al. .................. 354/173.1
4,616,913 10/1986  Suzuki et al. ..................... 354/173.1
4,647,169  3/1987  Suzuki et al. ..................... 354/173.1

Primary Examiner—Michael L. Gellner
Attorney, Agent, or Firm—Robin Blecker & Daley

[57] ABSTRACT

A motorized drive device for a camera having a motor and a transmission system. The deceleration control of the motor is started when an object being driven arrives at a short distance from a prescribed stop position. The detection of a fall of the speed of the object to an abnormal low value is carried out during the deceleration control period and its preceding motor drive period by respective different processes from each other.

12 Claims, 20 Drawing Figures

FIG. 9

| REGISTER RL | | | | HEXA-DECIMAL | MODE |
|---|---|---|---|---|---|
| 4 | bit 3 | 2 | 1 | | |
| 0 | 0 | 0 | 0 | 00H | SINGLE SHOOTING HIGH SPEED |
| 0 | 1 | 0 | 0 | 04H | SINGLE SHOOTING AUTOMATIC SPEED CHANGE |
| 0 | 0 | 0 | 1 | 01H | CONTINUOUS SHOOTING HIGH SPEED |
| 0 | 1 | 0 | 1 | 05H | CONTINUOUS SHOOTING AUTOMATIC SPEED CHANGE |
| 0 | 0 | 1 | 0 | 02H | CONTINUOUS SHOOTING LOW SPEED |
| 1 | 0 | 1 | 0 | 0AH | SELF-TIMER 10 SEC. |
| 1 | 0 | 1 | 1 | 0BH | SELF-TIMER 2 SEC. |

FIG. 10(A)
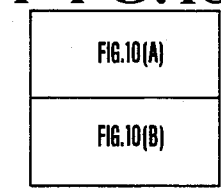
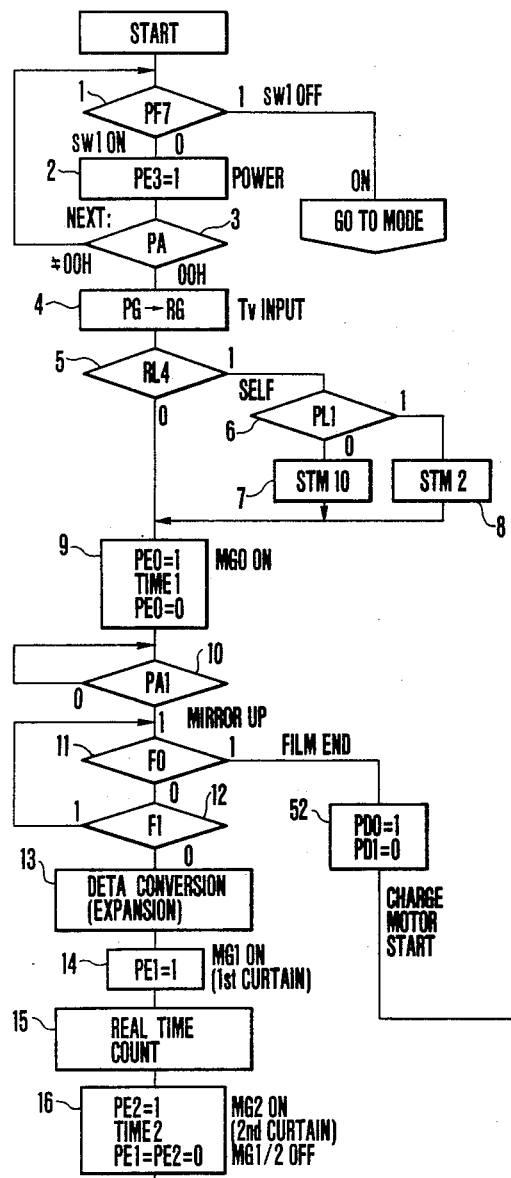

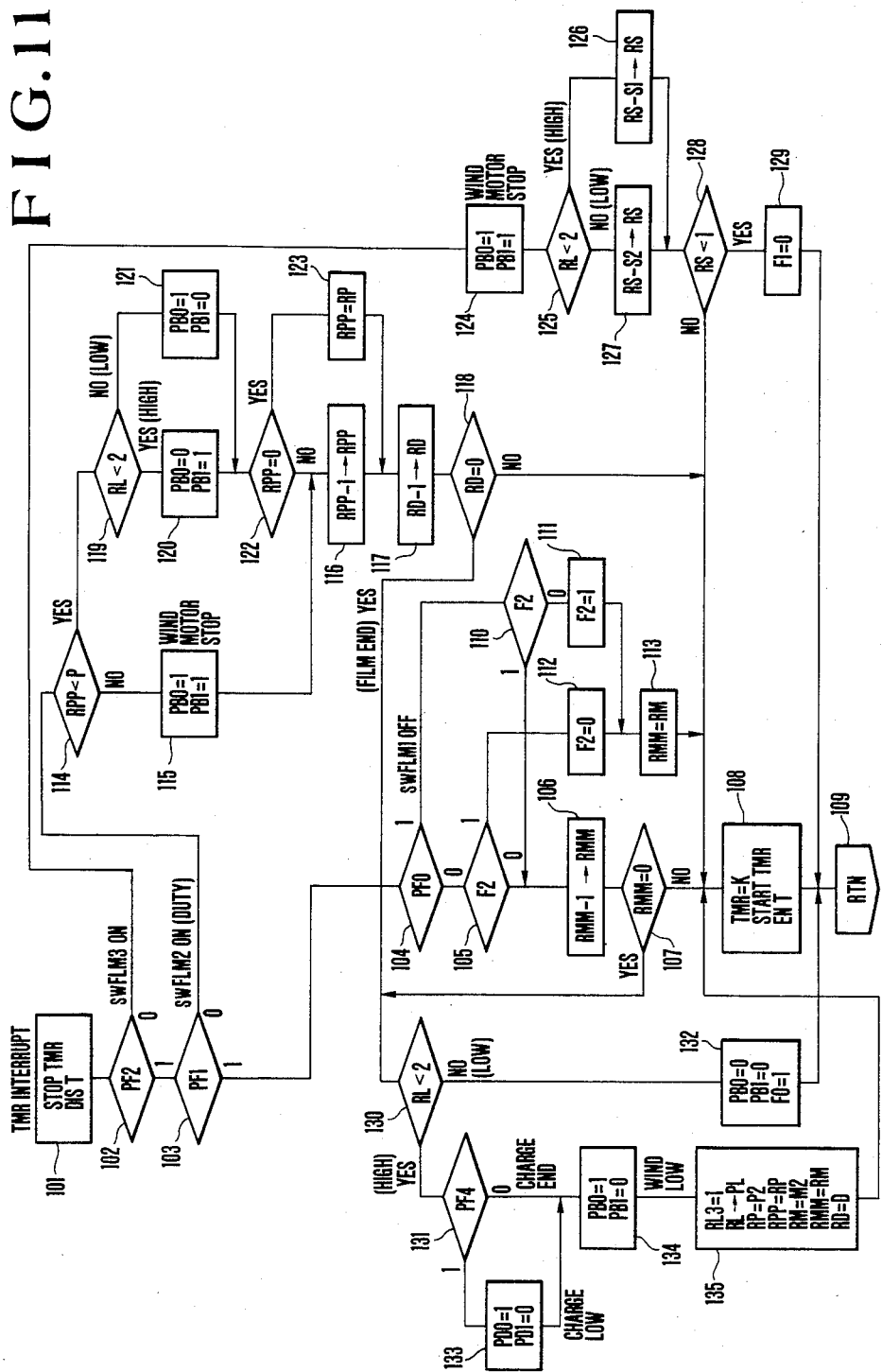

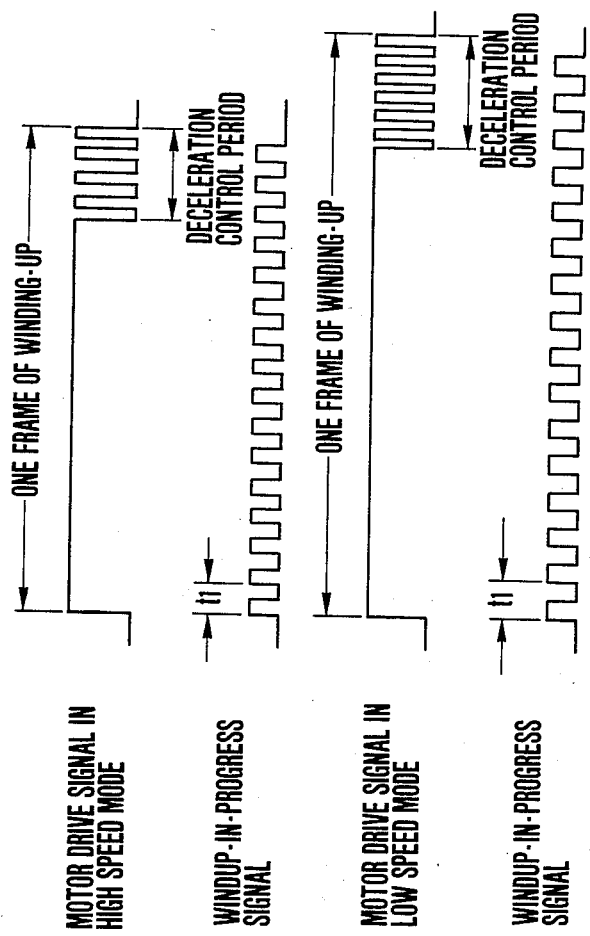
F I G. 18

MOTORIZED DRIVE DEVICE FOR CAMERA

BACKGROUND OF THE INVENTION

1. Field of the Invention:

This invention relates to motorized drive devices for cameras in which a motor drives a transmission system which in turn drives a camera mechanism.

2. Description of the Related Art:

Recently, the automatic drive device has widely been used in cameras. As the charging of the shutter and the lens and the winding-up and rewinding of the film are driven by either a single motor or a plurality of motors, the manageability of the camera is being very much improved.

The use of such a device can remove the necessity of using the mechanical stopping control of the motor when the completion of winding-up or the completion of charging is electrically detected to stop the motor. But, the motor is rotating at a very high speed and so cannot stop suddenly in response to the stop signal. Hence it takes a somewhat long time for the object being driven to stop stably as measured from the moment at which the stop signal has been given. This permits the object being driven to overrun. Particularly in the case of the small speed reduction ratio for the high speed mode, the object will overrun a long distance. If it happens that the overrun distance takes a longer value than a critical level, many drawbacks will arise. For example, the film windup system will advance the film a longer length than that of one frame. On this account, during a short time before the completion of winding-up, the drive signal for the motor may be made to vary in duty fashion, or the drive voltage may be made to decrease in order to decelerate the motor so that the length through which the film is advanced is accurately adjusted to that of one frame. To assure the accurate control of deceleration of the motor, the load on the film windup system must be taken into account. When the torque to pull out the film from the cartridge increases largely, or when the voltage of the electrical power source falls below the satisfactory operating level (including the case that it is caused by a large drop of the ambient temperature), the film cannot be advanced through the full length of one frame. Therefore, it is required to always monitor the speed of movement of the film not only during the deceleration control period but also during its preceding motor drive period. It is also of importance to discriminate between an accidental large decrease of the speed of film and the film end.

However, if the same abnormal low speed (including the film stop) detecting process as in the motor drive period which precedes the deceleration control period is applied even to the deceleration control period, the following problem arises. Because the deceleration control process and the abnormal low speed detecting process must be carried out simultaneously, and, particularly when they are executed in software fashion by a microcomputer, because both processes must be treated time-serially by a timer interrupt handing, it takes a considerably long time to do this timer interrupt handling, causing the treatment of the main routine to delay. Therefore, the other systems, for example, the charge system, will suffer over-charging or other serious faulty operations with a high possibility.

Also, if the same abnormal low speed detecting process is used in both of the deceleration control period and the motor drive period that precedes it, the reference level for the detection must be set considerably low in view of the deceleration control period. Even when the speed decreases considerably in the motor drive period that precedes the deceleration control period, the automatic changeover of the speed reduction ratio from the high to the low speed will fail.

SUMMARY OF THE INVENTION

An object of the present invention is to provide a camera whose mechanisms are driven by motors through transmission systems.

Another object is to provide a motorized drive device for such camera which enables the abnormal low speed detection to be carried out in a way suited to the drive speed of the camera mechanism.

BRIEF DESCRIPTION OF THE DRAWINGS

FIGS. 1 to 12 illustrate embodiments of the present invention.

FIG. 1 is a front view of a camera.

FIG. 2 is a top view of the same, broken away in part to show interior detail.

FIG. 3 is a perspective view of a charge transmission system.

FIG. 4 is a perspective view of a windup transmission system.

FIG. 5 is a perspective view of a rewind transmission system.

FIG. 6 is an electrical circuit diagram of a microcomputer and its peripheral circuits.

FIG. 7 is an electrical circuit diagram of a drive circuit.

FIG. 8 is a block diagram illustrating a decoder and a display device.

FIG. 9 is a table of codes for modes.

FIGS. 10, 10(A), 10(B), 11 and 12 are flow charts.

FIG. 18 is a time chart illustrating the signals in the various portions of FIG. 16.

DETAILED DESCRIPTION OF THE PREFERRED EMBODIMENT

Figure 1:
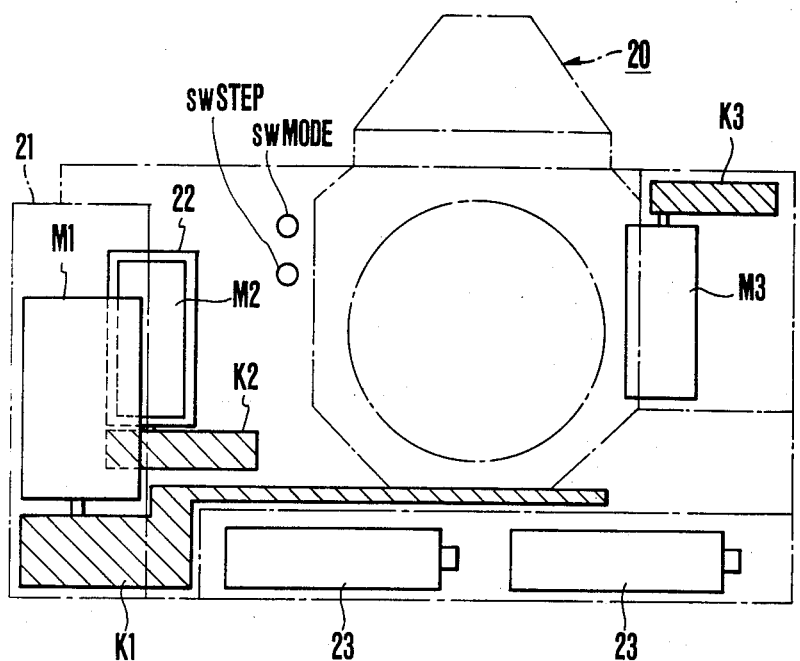

FIG. 1 shows how three electric motors M1 to M3 are arranged within a camera housing as viewed from the front thereof. The motor M1 governs charging of a shutter, a diaphragm adjusting mechanism, a diaphragm drive mechanism and a mirror mechanism, and is put in a left hand front corner of the camera 20 as viewed from the front. As for the charge motor M1, though the load change due to the environmental factors is small, a relatively large driving torque is required, because the absolute load is large. Hence, it takes necessarily a large size. From this reason, the left hand front corner is protruded in the form of a grip 21 to create therein a space the charge motor M1 occupies. K1 is a charge transmission system for the charge motor M1. The windup motor M2 occupies a space within a spool structure 22 and is arranged adjacent to a windup transmission system K2. The rewind motor M3 has its place near a cartridge chamber on the right hand side of a mirror box, and is arranged adjacent to a rewind transmission system K3. An electrical power source 23 consists of four AA type batteries.

Figure 2:
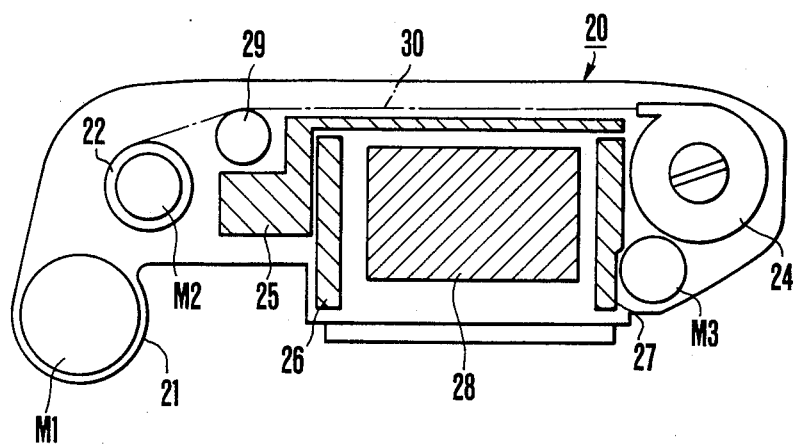

FIG. 2 is a plan view looked from the above of the camera 20 of the arrangement of the motors M1 to M3 along with a film cartridge 24, a blade type vertically running shutter 25, a mirror mechanism 26, an adjusting mechanism 27 for a diaphragm in a lens mounting, a drive mechanism 28 for the diaphragm and a sprocket structure 29 for indexing the fed amount of film 30.

Figure 3:
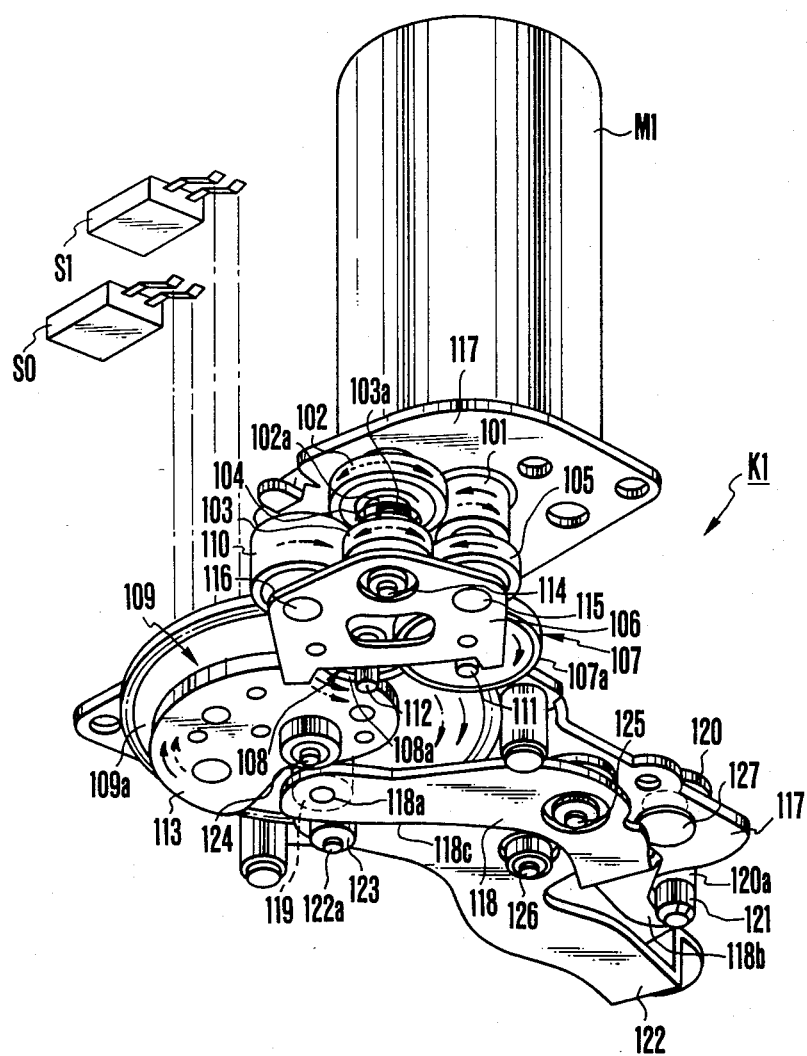

In FIG. 3, there is shown the detail of the charge motor M1 and the charge transmission system K1.

A pinion gear 101 is fixed to the output shaft of the charge motor M1, and meshes with a gear 102. The gear 102 and a gear 103 constitute a a 2-stage gear, and are each rotatably mounted on a common shaft 114 planted on a base plate 117. Protruded portions 102a and 103a are formed on the gears 102 and 103 respectively, alternating with each other in directions of thrust. By the engagement of these protruded portions 102a and 103a, the gears 102 and 103 move together in engagement in the direction of rotation, but freely move relative to each other in the directions of thrust. Meanwhile, the gear 103 has a surface in contact with a planetary lever 106 pivotal about the shaft 114 and frictionally contacts with the planetary lever 106 by a compression spring 104 arranged between the gears 102 and 103. Thereby, the planetary lever 106 followingly rotates in the direction of rotation of the gear 103. A gear 105 is rotatably mounted on a shaft 115 planted on the planetary lever 106 and always meshes with the gear 103. A 2-stage gear 107 has a large gear 107a and a small gear (not shown) fixedly formed on the upper surface of the gear 107a and is rotatably mounted on a shaft 111 planted on the base plate 117. When the gear 103 rotates in a clockwise direction, and the gear 105 rotates in a counterclockwise direction (indicated by arrow), the planetary lever 106 is turned in the clockwise direction, bringing the large gear 107a into engagement with the gear 105. A gear 108 is rotatably mounted on a shaft 112 planted on the base plate 117 and consists of a large gear 108a and a small gear (not shown) fixedly formed on the upper surface thereof. The large gear 108a always meshes with the small gear of the gear 107. A gear 110 is rotatably mounted on a shaft 116 on the planetary lever 106 and always meshes with the gear 103. When the gear 103 rotates in the counterclockwise direction and the planetary lever 106 turns in the counterclockwise direction, the gear 110 meshes with the large gear 108a. A cam gear 109 is rotatably mounted on a shaft 124 planted on the base plate 117, and has a gear 109a and a cam 113 formed thereon. The gear 109a always meshes with the small gear of the gear 108.

Such a transmission system from the pinion 101 to the cam gear 109 is changed over between two speed reduction ratios depending on the direction of rotation of the motor M1. That is, when the charge motor M1 rotates in the counterclockwise direction, all the parts rotate in a direction indicated by a solid line arrow with the planetary lever 106 turning in the clockwise direction to establish a low speed gear train of large reduction ratio: the pinion gear 101→ the gears 102, 103→ the gear 105→ the gear 107 (large gear 107a, small gear)→ the gear 108 (large gear 108a, small gear)→ the cam gear 109. Conversely when the charge motor M1 rotates in the clockwise direction, all the parts except the cam gear 109 rotate in the reverse direction indicated by a dashed line arrow, and the planetary lever 106 turns in the counterclockwise direction to establish another or high speed gear train of small reduction ratio: the pinion 101→ the gear 102, 103, → the gear 110→ the gear 108 (large gear 108a, small gear)→ the cam gear 109. For note, these two gear trains are so arranged that the cam gear 109 always rotates in the clockwise direction regardless of which direction the rotation of the charge motor M1 takes.

A first shutter charge lever 118 is pivotally mounted on a shaft 125 planted on the base plate 117 and has one end on which is rotatably mounted a roller 119 about a shaft 118a, the other end of which is formed to a cam 118b. The roller 119 runs on the outer periphery or camming surface of the cam 113 of the cam gear 109, giving the first shutter charge lever 118 a swinging movement that follows the displacement of the camming surface. And, this swinging movement causes the cam 118b also to swing. A second shutter charge lever 120 is rotatably mounted on a shaft 127 planted on the base plate 117, and has a roller 121 rotatable about a shaft 120a. The roller 121 is in engagement with the cam 118b so that the second shutter charge lever 120 can be swung by the swinging of the first shutter charge lever 118. And, the second shutter charge lever 120 charges a publicly known shutter mechanism (not shown).

A lever 122 for charging a publicly known aperture adjusting mechanism, a mirror operating mechanism and a drive mechanism for the diaphragm in a lens mounting, is rotatably mounted on a shaft 126 planted on the base plate 117, and has one end on which a roller 123 is rotatably mounted about a shaft 122a. This roller 123 is in engagement with a cam 118c of the first shutter charge lever 118. Therefore, the lever 122 also swings as the first shutter charge lever 118 swings, thereby the aperture adjusting mechanism, the mirror operating mechanism and others are charged.

A contact member S0 constitutes a switch together with a pulse signal substrate fixed to the cam gear 109 and (not shown) having a comb-like electrically conductive pattern thereon. This switch detects a point in time a little earlier than when the charging by the charge motor M1 is complete.

Another contact member S1 also cooperates with the aforesaid pulse signal substrate to constitute a switch for detecting when the completion of charging by the charge motor M1 is reached.

Figure 4:
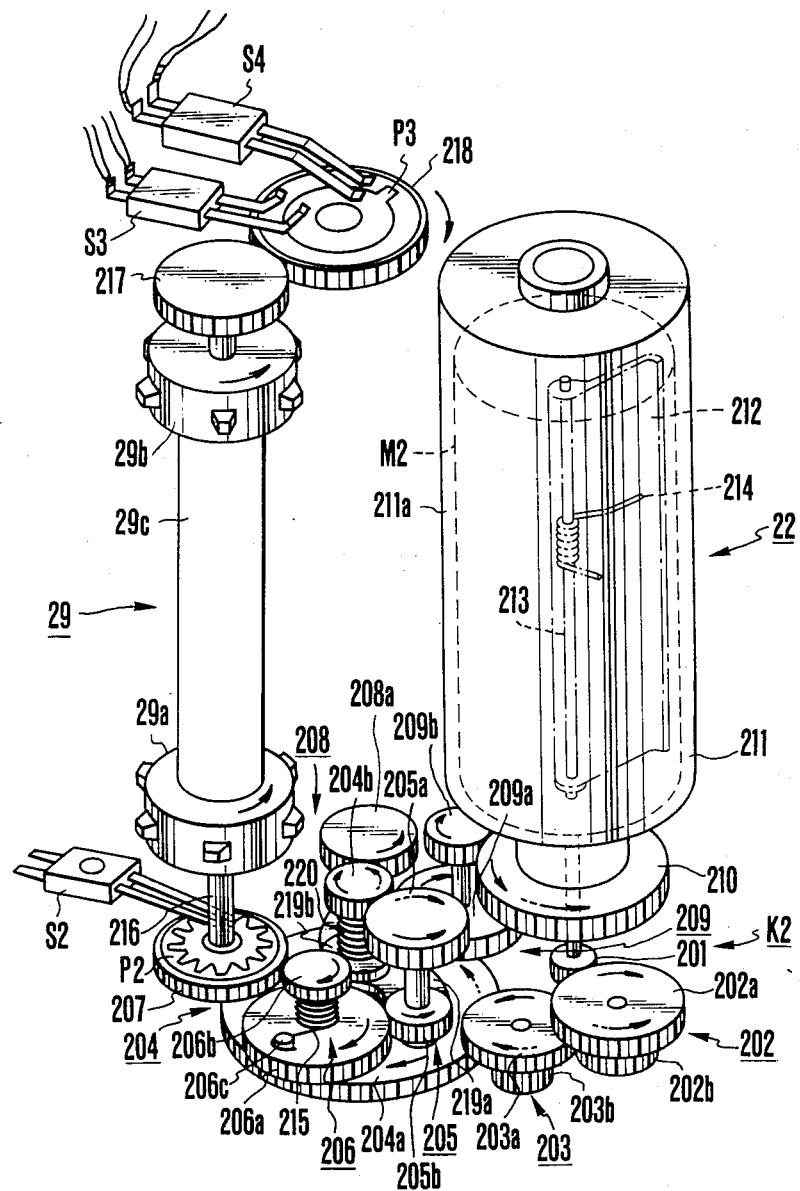

In FIG. 4 there is shown the detail of the windup motor M2 and the windup transmission system K2.

A pinion 201 is fixed to the output shaft of the windup motor M2 arranged in the interior of the spool structure 22. A 2-stage gear 202 has a large gear 202a and a small gear 202b, and is rotatably mounted. The large gear 202a meshes with the pinion 201. Another 2-stage gear 203 having a large gear 203a and a small gear 203b is rotatably mounted and the large gear 203a meshes with the small gear 202b. Another 2-stage gear 204 having a large gear 204a and a small gear 204b is rotatably mounted, and the large gear 204a meshes with the small gear 203b. A planetary lever 219a is rotatably mounted on a common shaft of the 2-stage gear 204 through a bearing 219b. A compression spring 220 is arranged between the small gear 204b and the bearing 219b to bring the bearing 219b and the large gear 204a into frictional contact with each other. By this frictional contact, the planetary lever 219a is caused to turn in the same direction as that of rotation of the gear 204. A 2-stage gear 205 having a large gear 205a and a small gear 205b and another 2-stage gear 208 having a large gear 208a and a small gear (not shown) formed in fixed relation on the lower surface thereof are rotatably mounted on the planetary lever 219a. A 2-stage gear 206 is arranged adjacent the gear 205, and its large and small gears 206a and 206b are rotatably mounted independently of each other. A coil spring 215 is arranged between the large and small gears 206a and 206b with one end of the spring 215 being fixed to a boss 206c of the large gear 206a so that the spring 215 functions as a one-way clutch operating in such a manner that as the large gear 206a rotates in a clockwise direction, the coil spring 215 tightens the shaft portion of the small gear 206b, causing the small gear 206b to be rotated in unison with the large gear 206a. A gear 207 always meshes with the small gear 206b, causing the sprocket structure 29 to rotate by a shaft 216. The sprocket structure 29 comprises sprockets 29a and 29b and a shaft 29c. A pulse signal substrate disc P2 whose entire periphery is divided into 12 equal parts is fixed to the gear 207 so that when the sprockets 29a, 29b rotate one revolution, twelve pulses are obtained through a contact member S2. Because the number of teeth on each of the sprockets 29a, 29b six, and, in the camera of 35 mm full size, its 4/3 revolutions advance the film by one frame, therefore, the number of pulses obtained through the contact member S2 is sixteen. Needless to say, it is possible to choose a desired number of divided equal parts for the pulse signal substrate disc P2.

A 2-stage gear 209 is arranged adjacent the gear 208, has a large gear 209a and a small gear 209b and is rotatably mounted. A spool gear 210 is fixed to a spool 211 of the spool structure 22, rotatably mounted, and always meshes with the small gear 209b. The surface of the spool 211 is coated with a rubber member 211a over the entire periphery thereof to promote automatic winding of the leader of the film. Further, a cover 212 is arranged adjacent the outside of the spool 211 to be pivotal about a shaft 213. A spring 214 urges the cover 212 toward the spool 211, thus performing a function of promoting the automatic winding of the film leader on the spool 211. For note, though the cover 211, shaft 213 and spring 214 are shown in only one unit, there is another unit on the opposite side.

Rotation of the sprocket 29b is transmitted to a gear 217 by a shaft connected thereto, and therefrom further to a detection gear 218 meshing with the gear 217. The ratio of the numbers of teeth of the gear 217 and the detection gear 218 is 3:4. A pulse signal substrate disc P3 for producing one pulse for every one revolution is fixed to the gear 218. This pulse is obtained by either of contact members S3 and S4. The contact member S3 is placed ahead the contact member S4 by a prescribed phase. By the pulse from the contact member S3 the drive mode of the windup motor M2 is changed to the duty one, by which the number of revolutions per unit time is lowered, permitting the windup motor M2 to stop rapidly when braked as the pulse from the contact member S4 is later produced.

The control of one cycle of operation of the windup motor M2 by the pulse produced in one revolution of the detection gear 218 results in that, in the case of the camera of 35 mm full size, the film is advanced one frame. Though it is as a matter of course, if the ratio of the numbers of teeth of the gear 217 and the detection gear 218 is altered to 3:2, or if, while the number-of-teeth ratio is left unchanged from 3:4, as the pulse signal substrate P3 is divided into two equal parts, one pulse is produced for every 180° of rotation, the amount of film fed in one cycle can be the half size. Also, if, in this case, the windup motor M2 is otherwise made to stop when two pulses have been counted, the amount of film fed can be returned to the full size. Further, if the number of counted pulses is made to change over between one and two, the feeding of film easily corresponds to either of the full size and the half size.

We explain about the transmission of the torque of the windup motor M2. When the windup motor M2 rotates in the counterclockwise direction, each part rotates in a direction of solid line arrow, and the gear 204 rotates in the clockwise direction, causing the planetary lever 219a to turn in the clockwise direction until the small gear 205b engages the large gear 206a, and, at the same time, the small gear of the gear 208 engages the large gear 209a. Therefore, the rotation of the windup motor M2 is transmitted as the pinion 201→ the gear 202 (large and small gears 202a, 202b )→ the gear 203 (large and small gear 203a, 203b )→ the gear 204 (large and small gears 204a, 204b)→ the gear 205 (large and small gears 205a, 205b)→ the gear 206 (large and small gears 206a, 206b)→ the gear 207→ the sprockets 29a, 29b at a speed reduction ratio for slow movement of the film, and at the same time, the gear 204 (large and small gears 204a, 204b)→ the gear 208 (large gear 208a and small gear)→ the gear 209 (large and small gears 209a, 209b)→ the spool gear 210→ the spool structure 22 at the speed reduction ratio for the slow rotation of the spool 211.

Conversely when the windup motor M2 rotates in the clockwise direction, as each part rotates in the direction of dashed line arrow, the gear 204 rotates in the counterclockwise direction, causing the planetary lever 219a to turn in the counterclockwise direction until the large gear 205a engages directly the spool gear 210. Therefore, the transmission system K2 is changed over to the small speed reduction rotio for fast rotation of the spool 211, comprising: the pinion 201→ the gear 202 (large and small gears 202a, 202b)→ the gear 203 (large and small gears 203a, 203b)→ the gear 204 (large and small gears 204a, 204b)→ the large gear 205a→ the spool gear 210. For note, the sprockets 29a and 29b are cut off from the transmission system K2, becoming freely rotatable.

As will be seen from the foregoing, that part of the transmission system K2 which goes from the windup motor M2 to the spool structure 22 operates with selection of two speed reduction ratios depending on the direction of rotation of the windup motor M2. In more detail, when it is counterclockwise, the speed reduction ratio for the slow speed results. Conversely when clockwise, the other reduction ratio for the high speed results. In either of the directions of rotation, the spool structure 22 always rotates in the counterclockwise direction.

For note, when the film is to be automatically loaded, the windup motor M2 is rotated in the counterclockwise direction, changing the speed reduction ratio of the windup transmission system K2 to the low speed side. So, the sprocket structure 29 and the spool structure 22 are driven to rotate at the slow speed until the light-struck area of the film is moved away from the film gate. After that, for the frame-by-frame advancement of the film that follows the completion of each exposure, if the camera was manually set in either single shooting, or continuous shooting, high speed mode, and the operating condition is normal, the windup motor M2 is then rotated in the clockwise direction, changing over the windup transmission system K2 to the high speed side. Therefore, only the spool structure 22 is driven to rotate at the high speed. If, at a time during the frame-by-frame feeding, the battery voltage drops below the critical level, or the load becomes excessive, the direction of rotation of the windup motor M2 is automatically changed to the counterclockwise, thereby the speed reduction ratio is changed over from the high speed to the low speed. Though the sprocket structure 29 and the spool structure 22 are both driven to rotate, since the speed reduction ratios of the transmission systems to them are so predetermined that the peripheral speed of the spool structure 22 is faster than that of the sprocket structure 29, because the sprocket structure 29 is driven by the film which is pulled by the rotating spool structure 22, there is no problem. Therefore, only when the film is not pulled by the spool structure 22, the sprocket structure 29 takes role of driving the film. In the other situation, the sprocket structure 29 follows up the film regardless of the direction of rotation of the windup motor M2.

Figure 5:
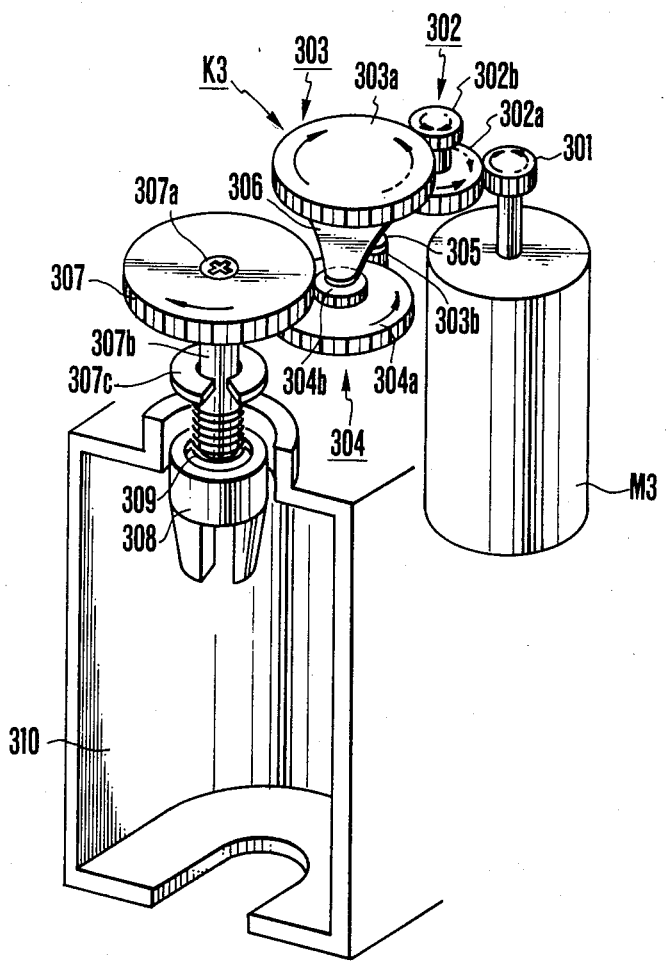

In FIG. 5, there is shown the detail of the rewind motor M3 and the rewind transmission system K3.

A pinion 301 is fixed to the output shaft of the rewind motor M3. A 2-stage gear 302 having a large gear 302a and a small gear 302b is rotatably mounted, the large gear 302a meshing with the pinion 301. Another 2-stage 303 having a large gear 303a and a small gear 303b is rotatably mounted, the large gear 303a meshing with the small gear 302b. A planetary lever 306 is pivotally mounted on a common shaft of the gear 303. A compression spring 305 is arranged between the small gear 303b and the planetary lever 306 to bring the planetary lever 306 into frictional contact with the large gear 303a. By this frictional contact the planetary lever 306 is caused to follow up the direction of rotation of the gear 303. Another 2-stage gear 304 having a large gear 304a and a small gear 304b is rotatably mounted on the free end of the planetary lever 306. A gear 307 is mounted on one end of a shaft 307b by a fastener screw 307a, the opposite end of which carries a fork 308. The fork 308 extends into the interior of a cartridge chamber 310, and is arranged to engage with the hub of a supply spool in the cartridge (not shown). A coil spring 309 is arranged between a washer 307c on the shaft 307b and the shoulder of a fork 308 to make it easy to insert the film cartridge into the chamber 310, as the fork 308 can temporarily retract.

When the rewind motor M3 rotates in the clockwise direction, the gear 303 rotates in the clockwise direction, causing the planetary lever 306 to turn in the clockwise direction until the small gear 304b comes to mesh with the gear 307. Therefore, the driving torque is transmitted: the pinion 301→ the gear 302 (large gear 302a, small gear 302b)→ the gear 303 (large and small gears 303a, 303b)→ the gear 304 (large and small gears 304a, 304b)→ the gear 307→ the fork 308. Conversely when the rewind motor M3 rotates in the counterclockwise direction, the planetary lever 306 turns in the counterclockwise direction, taking the small gear 304b out of mesh with the gear 307. Thus, the driving torque is not transmitted to the fork 308. Therefore, by rendering the rewind motor M3 to turn some angles in the counterclockwise direction, it is made possible not to add the rewind transmission system K3 and the rewind motor M3 to the winding-up load when the wind-up motor M2 perform the film winding operation. Thus, the load with which the winding-up of the film accompanies can be minimized.

Figure 6:
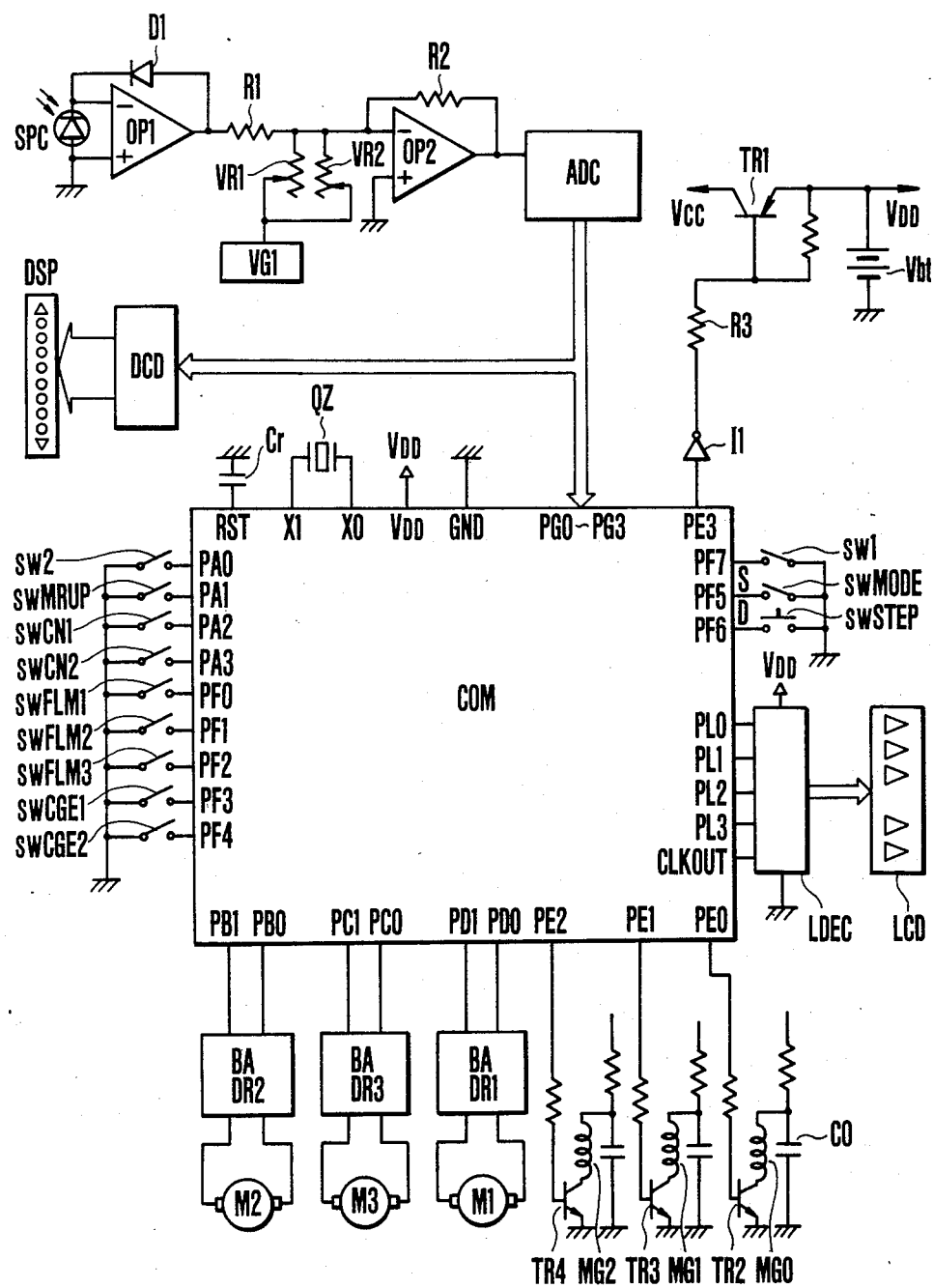

FIG. 6 illustrates a practical example of the electrical circuitry of the camera using a microcomputer COM as control means 402 to be described later.

A photosensitive element SPC receives light from an object to be photographed and produces an output signal which is applied to an operational amplifier OP1 of high input impedance with a compression diode D1 connected in the feedback loop thereof. The operational amplifier OP1 produces an output representing the logarithm of the brightness of the object or brightnesses information Bv through a resistor R1. Two variable resistors VR1 and VR2 are connected to a constant voltage source VG1, producing outputs of film sensitivity information Sv and aperture information Av respectively. Another operational amplifier OP2 with a resistor R2 connected in the feedback loop thereof computes a shutter time information based on the formula: $Tv=(Bv+Sv-Av)$. The shutter time information Tv is converted to a 4-bit digital value by an A/D converter ADC, being displayed by a display device DSP within the finder after the passage through a decoder driver DCD. The output of the A/D converter ADC is also applied to input ports PG0 to PG3 of the microcomputer COM. For note, of the 4-bit codes, 0001 to 1000 correspond to 1/1000 to ⅛ sec. and the other codes 0000 to more than 1000 correspond to alarming display elements.

When a release button (not shown) is pushed down to a first stroke, a first stroke switch sw1 which is connected to an input port PF7 turns on. Responsive to this, an output port PE3 changes its potential to high level. Then, by an inverter 11 and a resistor R3, a transistor TR1 turns on, thereby the voltage from a battery Vbt is supplied as the electrical power source voltage Vcc to the various circuit portions. An arrow ↑ in the figure represents that Vcc. Even to those circuit blocks which are not marked by that arrow, for example, the operational amplifiers and the A/D converter, the voltage Vcc is supplied as a matter of course. For note, the microcomputer COM, the decoder LDEC and the display device LCD are supplied with another power source voltage $V_{DD}$.

A terminal RST of the microcomputer COM is connected to a capacitor Cr, terminals X0 and X1 to a quartz oscillator QZ, a terminal $V_{DD}$ to the electrical power source $V_{DD}$, and a terminal GND grounded.

Input ports PA0 to PA3 are connected to a second stroke switch sw2 which turns on when the release button is pushed to the second stroke, a mirror-up switch swMRUP which turns off and on when the mirror moves upward and downward respectively, a leading curtain switch swCN1 which turns off when the leading curtain has run down, and on when the charging is complete, and a trailing curtain switch swCH2 which turns off when the trailing curtain has run down and on when the charging is complete.

Input ports PF0 to PF4 are respectively connected to a first film switch swFLM1 comprising the pulse signal substrate disc P2 and the contact member S2 (FIG. 4), a second film switch swFLM2 comprising the pulse signal substrate disc P3 and the contact member S3 (FIG. 4), a third film switch swFLM3 comprising the pulse signal substrate disc P3 and the contact member S4, a first charge switch swCGE1 comprising a pulse signal substrate disc fixed to the cam gear 109 (FIG. 3) and the contact member S0 and arranged to turn on a little earlier than when the charging is complete, and a second charge switch swCGE2 comprising the same pulse signal substrate and the contact member S1 and arranged to turn on when the charging is complete.

Another input port PF5 is connected to a self-drive changeover switch swMODE which turns off when a self-timer mode S is set in, and on when a drive mode D is set in.

Another input port PF6 is connected to a pushbutton type selection switch swSTEP which is pushed when self-times (2 sec. 10 sec.) in the self-timer mode S, or modes (single shooting with high speed, continuous shooting with high speed, continuous shooting with low speed) in the drive mode D are selected. The self-drive changeover switch swMODE and the selection switch swSTEP correspond to setting means 401 (to be described later) in FIG. 13, and are provided in easy-to-operate positions of the camera body, for example, the front surface of the right hand side of the lens.

Output ports PE0 to PE2 are respectively connected to the bases of transistors TR2 to TR4 controlling the current supplies to a first latch magnet MG0 with a permagnet magnet for actuating a mechanical release operation, a leading curtain magnet MG1 for causing the leading curtain to run down, and a trailing curtain magnet MG2 for causing the trailing curtain to run down.

Output ports PB0, PB1 are connected to a drive circuit DR2 for driving the windup motor M2; Output ports PC0, PC1 are connected to a drive circuit DR3 for driving the rewind motor M3; Output ports PD0, PD1 are connected to a drive circuit DR1 for driving the charge motor M1.

Figure 7:
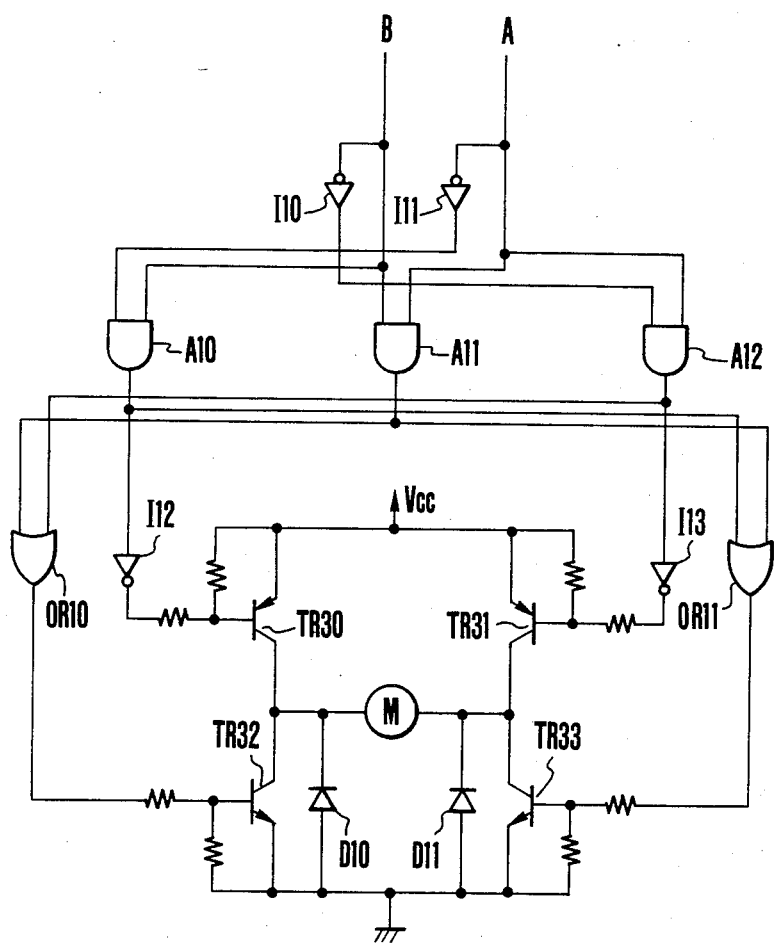

The drive circuits DR1–DR3 are similar in construction to each other. Its circuit construction is shown in FIG. 7. A 2bit signal enters input terminals A and B. At first, suppose A=1, B=0, then, because the signal of the input terminal B is inverted by an inverter I10, the output of an AND gate A12 becomes 1, and the output of an OR gate OR10 also becomes 1, thereby by a transistor TR32 is turned on. Also, because the output of an inverter I13 becomes 0, a transistor TR31 also turns on. Therefore, the electrical power source voltage Vcc is applied to the motor M, and the motor M rotates in the prescribed direction.

When A=0, B=1, because the signal of the input terminal A is inverted by an inverter I11, the output of an AND gate A10 becomes 1 and the output of an OR gate OR11 also becomes 1, and the output of an inverter I12 becomes 0, thereby transistors TR30 and TR33 are turned on. A reverse current flows to the motor M and the motor M rotates in the reverse direction.

When A=1, B=1, the output of an AND gate A11 becomes 1, and the outputs of the OR gates OR10, OR11 also become 1, thereby the transistors TR32 and TR33 are turned on. Therefore, this mode takes place during the time when the motor M is rotating, the current supply is cut off by diodes D10, D11 and the transistors TR32 and TR33, regardless of in whichever direction the motor M rotates, and moreover, both ends of the winding of the motor M are short-circuited to brake the motor M against its inertial rotation.

When A=0, B=0 are become, the outputs of all the AND gates A10 to A12 become 0, and all the transistors TR30 to TR33 are turned off, putting the motor M in open state.

Returning to FIG. 6, from output ports PL0 to PL3, a 4-bit binary signal of a register RL in the microcomputer COM is produced. From an output port CLKOUT a train of clock pulses of as low a frequency as about 2 Hz obtained by dividing the master frequency of the quartz oscillator QZ is produced. These output ports are connected to the decoder LDEC, and the decoder LDEC is connected to the display device LCD constructed with liquid crystal and others. The display device LCD is provided on the upper panel of the camera housing or within the finder.

Figure 8:
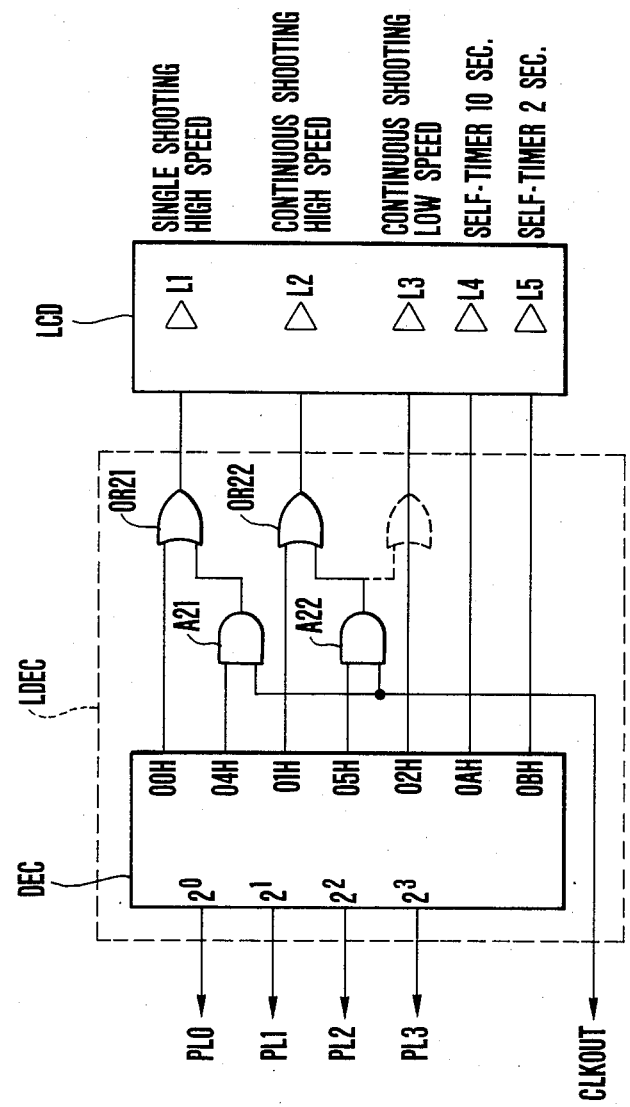

In FIG. 8, there is shown the detail of the decoder LDEC and the display device LCD. The decoder LDEC comprises a binary-hexadecimal decoder DEC, AND gates A21, A22 and OR gates OR21, OR22. The binary-hexadecimal decoder DEC converts the binary 4-bit signal to a hexadecimal number as shown in FIG. 9. The display device LCD lights on either continuously, or intermittently, at the one of display elements L1 to L5 which corresponds to that hexadecimal number. The blinking of the display element L1 represents automatic variation of the speed in the single shooting mode. The blinking of the display element L2 represents automatic variation of the speed in the continuous shooting mode. The OR gates OR22 may otherwise be connected as indicated by dashed line in FIG. 8 so that the automatic variation of the speed in the continuous shooting mode is alarmed by the display element L3 for the continuous shooting with the low speed.

The operation of the microcomputer COM is described by reference to the flow charts of FIGS. 10 to 12.

Upon supply of the electrical power source voltage $V_{DD}$, the microcomputer COM starts to operate. The master clock is supplied from the quartz oscillator QZ, and, at the same time, the power-on resetting is effected by a capacitor Cr. An incorporated program counter is initially set to an address No. 0 . Hence, the program begins with Start. Also, all flags are assumed to be 0, and all the output ports also to be 0.

Step 1:
An input enters at the input port PF7. (This input will hereinafter be called "PF7 input", and the same holds for the other ports). If the first stroke switch sw1 is ON, the flow advances to step 2. If OFF, it advances to a mode handling shown in FIG. 12.

Step 2:
The output port PE3 produces a signal of high level, turning on the transistor TR1 (FIG. 6) so that the electrical power source voltage Vcc is supplied to the various portions.

Step 3:
The PA input enters. If the charging of each portion is complete, and the photographer pushes the release button to the second stroke, PA0=PA1=PA2=PA3=0 results. Therefore, the PA input has a value of 00H in the hexadecimal number system. If the PA input is 00H, a release sequence is executed, advancing to step 4. If not so, return to Step 1. In short, when the first stroke switch sw1 only is ON, the Steps 1 to 3 repeat themselves, only performing the measurement of light and its display.

Step 4:
The Apex value of the shutter time Tv (PG input) obtained from the 4-bit digital value by the A/D converter ADC is caused to be memorized in the register RG in the interior of the microcomputer COM.

Step 5:
A branch command due to the data of the 4th bit of the register RL in the interior of the microcomputer COM (see FIG. 9). If the data of the 4th bit is 1, because it is the self-timer mode, the flow advances to step 6. If 0, jump to step 9.

Step 6:

A branch command due to the data of the 1st bit of the register RL. If this data is 0, representing that the self-timer is set to 10 sec., the next step 7 follows. If 1, representing that the self-time is 2 sec., jump to step 8 occurs.

Step 7:

The timer is permited to count 10 sec.

Step 8:

The timer counts 2 sec.

Step 9:

Change the PE0 output to 1, turning on the transistor TR2 (FIG. 6). The capacitor C0 which has been charged to a voltage almost equal to the electrical power source voltage Vcc is discharged to the first latch magnet MG0. Thereby, the mechanical release operation is initiated. After that, a waiting time TIME1 is made by a constant time timer. When this time is up, the PE0 output is changed to 0, releasing the current supply to the first latch magnet MG0. This waiting time TIME1 may be set to be slightly longer than the minimum time for which the first latch magnet MG0 is supplied with current. Here, the flow enters the mechanical sequence of the publicly known diaphragm-closing-down and mirror-up operations.

Step 10:

A routine for waiting time till the mirror up. When the mirror-up is complete, the flow advances to step 11. This routine is provided to insure the mirror-up before the shutter operates.

Step 11:

Test the flag F0. F0=1 represents the film end.

Step 12:

Test the flag F1. F1=0 represents the approval of the film stop at the time of the windup completion.

Step 13:

The content of the register RG which has memorized the shutter time in step 4 is data-converted to a value of multiple series. This is a routine for expanding the data so as to meet the actual control value because the value stored in the register RG is the logarithmically compressed one.

Step 14:

Change the PE1 output to 1, causing the leading curtain magnet MG1 to be supplied with current. In this stage, the leading curtain starts to run down.

Step 15:

Count the actual time by the data expanded in the step 13, and perform the measurement of the computed shutter time.

Step 16:

Change the PE2 output to 1 causing the trailing curtain magnet MG2 to be supplied with current, and the trailing curtain to run down. Now, the control of the focal plane shutter ends. A time TIME 2 necessary for the trailing curtain to complete its running down is made by the constant time timer. After that, by PE1=PE2=0, the current supplies to the leading and trailing curtain magnets MG1 and MG2 are released.

Step 17:

A routine for waiting for the turning-off of the trailing curtain switch swCN2, or the completion of the running-down of the trailing curtain. When the running-down is complete, the flow advances to step 18.

Step 18:

Examine whether the content of the register RL is smaller than 2 or above 2. From FIG. 9, if it is smaller than 2, either of the single shooting high speed mode and the continuous shooting high speed mode is set in. In either case, the speed reduction ratio has the value for the high speed. So, the flow advances to step 19. In the case of not less than 2, because the speed reduction ratio is for the low speed, jump to step 22 occurs.

Step 19:

By PD0=0, PD1=1, the drive circuit DR1 is operated to rotate the charge motor M1 in the direction in which the speed reduction ratio of the charge transmission system K1 (FIG. 3) is changed over to the high speed, so that the charging of the shutter, the mirror, the automatic diaphragm, etc. is effected at a high speed.

Step 20:

By PB0=0, PB1=1, the drive circuit DR2 is operated to rotate the windup motor M2 in the direction in which the speed reduction ratio of the windup transmission system K2 is changed over to the high speed, so that the film winding is effected at a high speed.

Step 21:

A register RP concerning the duty control just before the completion of winding is caused to memorize a constant number P1 for the speed reduction ratio for the high speed, and a register RM concerning the detection of a lowering of the windup speed is caused to memorize a constant number M1 for the speed reduction ratio for the high speed.

Step 22:

By PD0=1, PD1=0, the charge motor M1 is rotated in the direction in which the speed reduction ratio of the charge transmission system K1 is changed over to the low speed.

Step 23:

By PB0=1, PB1=1 the windup motor M2 is rotated in the direction in which the windup transmission system K2 is changed over to the low speed.

Step 24:

The register RP is caused to memorize a constant number P2 for the speed reduction ratio for the low speed, and a register RM is caused to memorize a constant number M2 for the speed reduction ratio for the low speed.

Step 25:

A register RD concerning the detection of a lowering of the windup speed during the period of duty control is caused to memorize a constant number D, another register RS concerning the approval time of the film stop to memorize a constant number S, another register RMM to memorize the content of the register RM, and another register RPP to memorize the content of the register RP. For example, the content of the register RMM becomes the constant number M1 when the speed reduction ratio is for the high speed, or a constant number M2 when it is for the low speed.

Set the flags F0=F2=0, F1=1. The setting of F1=1 means that from now a winding-up operation will start. The flag F2 represents the ON-OFF state of the first film switch swFLM1.

Step 26:

Set a constant number K in a timer TMR for the timer interrupt. The value of K is determined by the film winding-up speed, the number of equally divided parts of the pulse signal substrate P2 (FIG. 4) for the first film switch swFLM1 and the instruction cycle time of the microcomputer COM.

Start the timer TMR for the timer interrupt. Also enable the timer interruption. (EN T)

Since the timer TMR has started, it then repeats decrement, independently of the main program routine. So for every constant time (depending on the constant K) interruption takes place to allow for a jump from the program in execution to a specified timer interrupt address. Here, the timer interrupt handling is explained by FIG. 11.

Timer Interrupt Handling

Step 101:

Stop the decrement operation of the timer TMR, and prohibit the interruption.

Step 102:

The PF2 input from the third film switch swFLM3 which turns on each time the film has advanced one frame enters. Assuming here that the windup motor M2 has already been driven in the step 20 or 23, and the third film switch swFLM3 has turned off in the first timer interrupt, then the flow advances to step 103.

Step 103:

By the PF1 input from the second film switch swFLM2 which turns on ahead the completion of each cycle of film winding operation, branching is performed. The second film switch swFLM2 is provided for the purpose of improving the accuracy of stop control when the speed of the motor M2 is made to decrease just before the completion of the winding-up. Though, in this embodiment, the decrease of speed is carried out by the duty control, it may otherwise be made by lowering the voltage. Now, assuming that the winding up is not just at the completion, the flow then advances to step 104.

Step 104:

By the PF0 input from the first film switch swFLM1 which repeats ON and OFF during the winding-up of the film, branching is performed. Now, on assumption that F0=0, the flow then advances to step 105.

Step 105:

Test the flag F2. Since F2=0 has been set in step 25, advance to step 106.

Step 106:

After the content of the register RMM is subtracted by 1, the result is again memorized in the register RMM.

Step 107:

Test if RMM =0. Since, according to the up-to-now program, RMM=M1 (M2)−1, for the constant M1 (M2) is somewhat large in value, it does not become 0. Advance to step 108.

Step 108:

Set again the constant K in the timer register, and start the timer TMR, enabling the timer interrupt handling.

Step 109:

Return to the program that was initially executed. The timer interrupt handling has the aim to go testing the three film switches swFLM1, swFLM2 and swFLM3 successively in each constant time from the program that is in progress of execution. All the instructions of the program are executed at a very fast speed. In actual practice, therefore, the successive inputs of film windup informations in the constant times will give rise to no problem.

Now assuming that the turning-off of the first film switch swFLM1 is detected in a certain timer interrupt handling, jump from the step 104 to a step 110 occurs.

Step 110:

Test if the flag F2=1. Since F2=0 has been set in the step 25, the next step 111 follows.

Step 111:

Set the flag F2 to 1. This means that the first film switch swFLM1 has turned off, or a change to PF0=1 has occurred.

Step 112:

If, in the step 105, F2=1 has been detected, for the content of the flag F2 is brought into coincidence with the ON of the first film switch swFLM1, the flag F2 is here set to 0.

Step 113:

Set the content of the register RM again in the register RMM. Then, return to the step 108 to execute the aforesaid routine. As the winding is being performed for a while, when the film is advanced to just before one frame, the second film switch swFLM2 turns on with the result that PF1=0. Thus, jump from the step 103 to a step 114 occurs.

Step 114:

Examine whether the content of the register RPP is smaller than a constant number P or not less than the P. The register RPP is used for adjusting the duty ratio of the duty control. As has been described in connection with the steps 21, 24 and 25, the content of the register RPP at first has either the constant number P1 (for the speed reduction ratio for the high speed) or P2 (for the speed reduction ratio for the low speed). Because these values are set to be larger than the constant number P, at first advance to a step 115.

Step 115:

Set to PB0=1, PB1=1. Thereby, the current supply to the windup motor M2 is cut off, and braking is applied.

Step 116:

Subtract 1 from the content of the register RPP, and store the result again in the register RPP.

Step 117:

Subtract 1 from the content of the register RD, and store the result again in the register RD. The register RD is used for detecting the film end at a time during the period of duty control. In the step 25, a constant number D has been set therein. The constant number D is assumed to have a somewhat large value.

Step 118:

Test if the content of the register RD is 0. Since, it is, at first, not 0, jump to the step 108 occurs, executing the aforesaid routine.

After a number of cycles of the timer interrupt handling have been carried out, when the content of the register RPP falls below the constant number P, the program is branched from the step 114 to a step 119.

Step 119:

Examine whether the content of the register RL is smaller than 2 or not less than 2. From the reference to FIG. 9, when smaller than 2, or the speed reduction ratio is for the high speed, the next step follows. When not less than 2, or when it is for the low speed, jump to a step 121.

Step 120:

By PB0=0, PB1=1, the windup motor M2 is rotated in the direction in which the transmission system K2 (FIG. 4) is changed over to the high speed, and the high speed winding-up is performed.

Step 121:

By the change to PB0=1, PB1 32 0, the windup motor M2 is rotated in the direction in which the speed reduction ratio of the windup transmission system K2 is changed over to the low speed, and the low speed winding-up is performed.

Step 122:

Test if the content of the register RPP is 0. If not 0, return to the step 116 and execute the aforesaid routine. When it becomes 0, advance to a step 123.

Step 123:

Store the content of the register RP (constant number P1 or P2) again in the register RPP.

In such a manner, the duty control operates in the steps of putting a certain value to the register RPP, then subtracting 1 from the value in each cycle of timer interrupt (each constant time), cutting off the current supply to the windup motor M2 when the content of the register RPP is more than the constant number P, braking the motor M2, supplying the current to the windup motor M2 when the content is smaller than the constant number P, putting the original value to the register RPP when it becomes 0, and so on repeatedly. Therefore, the duty ratio is determined by the constant K of the timer TMR and the constant P1 or P2 set in the register RPP, and does not depend on the ON-OFF of the first film switch swFLM1.

Also, the content of the register RP is changed when in the speed reduction ratio for the high speed and when in the speed reduction ratio for the low speed in the steps 21 and 24. Therefore, the duty ratio can be chosen respectively independently of each other. Further, if the constant P2 is set to be smaller than the constant P, for example, 0, the flow advances from the step 114 always to the step 119. Thus, it is made possible not to perform the duty control when in the speed reduction ratio for the low speed.

Now assuming that as the deceleration of rotation of the windup motor M2 has been performed, when the winding-up of the film by one frame is complete, the third film switch swFLM3 turns on. At this time, it is in the timer interrupt handling that the flow is branched from the step 102 to a step 124.

Step 124:

Set to PB0=1, PB1=1. Thereby the windup motor M2 is de-energized and braked.

Step 125:

Similarly to the step 119, examine whether the content of the register RL is smaller than 2 or less than 2. When the speed reduction ratio is for the high speed, advance to the next step 126, and when for the low speed, advance to a step 127.

Step 126:

Subtract the constant S1 for the speed reduction ratio for the high speed from the contant of the register RS which has been set to the constant S in the step 25, and store the result again in the register RS. The register RS is used for setting the approval times T1 and T2 when the speed reduction ratio is for the high and low speeds respectively where the approval time is defined by the interval from the moment at which the stop signal has been given to the windup motor M2 to the moment at which the film stop is approved.

Step 127:

Similarly to the step 126, subtract the constant S2 for the speed reduction ratio for the low speed from the content of the register RS, and store the result again in the register RS.

Step 128:

Examine whether the content of the register RS is smaller than 1, or not less than 1. In the case of not less than 1, because it represents that the approval time T1 or T2 has not yet passed, return to the step 108 and execute the aforesaid routine. When smaller than 1, because the approval time T1 and T2 has expired, advance to the next step 129.

Step 129:

As the film is judged to be perfectly stationary, set to the flag F1=0.

Concerning the steps 124 to 129, since the interia of the windup transmission system the speed reduction ratio for the high speed and when in the speed reduction ratio for the low speed, because the stability time from the production of the stop signal (step 124) of the windup motor M2 to the reach of the film to the perfect stop differs, the approval times T1 and T2 (from the step 124 to the step 129) from the stop signal of the windup motor M2 to the judgement of the stop of the film are correspondingly differentiated from each other by determining different values for the constants S1 and S2 from each other. Therefore, when in the speed reduction ratio for the high speed where the inertia is smaller, the stop of the film can be approved in a shorter time than when in the speed reduction ratio for the low speed where the inertia is larger. Therefore, the next operation can be executed as fast as possible.

After the step 129, the flow returns through the step 109 to the program which is in progress of execution. Here notice that because the step 108 is not entered, an interrupt does not later take place.

We next consider a situation that the electrical power source voltage drops during the driving of the windup motor M2, or that despite the speed reduction ratio for the high speed has been set in, the film winding-up speed is caused to lower by the change of the temperature.

As the film winding-up speed becomes gradually lower, the time interval between the ON-OFF of the first film switch swFLM1 becomes longer. But, the timer interrupt takes place in each constant time. Therefore, the frequency of occurrence of the routine from the step 105 or step 110 to the step 106 increases. Finally, the content of the register RMM becomes 0. In such a manner, the lowering of the film winding-up speed is detected. At this time, the flow advances from the step 107 to a step 130. For note, that value of the register RM which initially sets the register RMM is, because the film winding-up speed differs when in the speed reduction ratios for the high and low speeds, for they must be determined independently of each other, are set to different constants M1 and M2 from each other in the steps 21 and 24.

The time-out routine for detecting the drop of the winding-up speed comprising the steps 104 to 107 and 110 to 113 is not used during the period of the duty control. The reason is that if this time-out routine is allowed to follow the last step 116, 123 of the duty control routine, the number of program steps in the timer interrupt handling becomes so large that the time till to return to the main routine becomes too long to prevent the timing of braking the charge motor M1, for example, from delaying, or situations that lead to a problem in the program that is in progress of execution are encountered.

Therefore, in the period of the duty control, by the steps 117 and 118, it is determined that the film winding-up speed has lowered when the time of the entire period of the duty control is longer than the time dependent on the initially set constant D of the register RD. The flow then branches to a step 130.

Step 130:

Examine whether the content of the register RL is smaller than 2 or not less than 2, or the speed reduction ratio is for the high speed or for the low speed. When in the speed reduction ratio for the high speed, advance to a step 131, and when for the low speed, advance to a step 132. With the speed reduction ratio for the high speed, when the film winding-up speed has lowered, the speed reduction ratio is changed over from the high speed to the low speed in order to make it possible to continue the film winding-up. With the speed reduction ratio for the low speed, when the film winding-up speed has lowered, so long as the electrical power source voltage is high enough to make possible the exposure control of the camera, on assumption that the ability to wind up the film with the speed reduction ratio for the low speed is sufficient, there is only the case of the film end.

Step 131:

Test the PF4 input representing the state of the second charge switch swCGE2. If the charging is not complete, advance to a step 133. If complete, advance to a step 134.

Step 132:

Since the advancing reaches this step when the speed reduction ratio is for the low speed, and the film winding-up speed has dropped, the film end has occurred as has been explained in the step 130. Therefore, by PB0=0, PB1=0, both ends of the winding of the windup motor M2 are opened. Also, to display the film end, the flag F0 is set to 1. Since, after this, the flow returns to the step 109, no subsequent timer interrupt takes place.

Step 133:

Because the case is such that the charging is not complete, by the change to PD0=1, PD1=0, the charge motor M1 is rotated in the direction in which the speed reduction ratio of the charge transmission system K1 (FIG. 3) is changed over to the low speed. Thus, the charging is performed at the low speed.

Step 134:

By the change to PB0=1, PB1=0, the windup motor M2 is rotated in the direction in which the speed reduction ratio of the windup transmission system K2 (FIG. 4) is changed over to the low speed. Thus, the winding-up is performed at the low speed.

Step 135:

Since, in the steps 133 and 134, the speed reduction ratio has been changed over from the high speed to the low speed automatically, the third bit of the register RL (FIG. 9) is set to 1 with alteration to the automatic speed-change mode. At the same time, the content of the register RL is outputted from the ports PL0 to PL3 to the decoder LDEC. Thereby, the display element L1 or L2 (FIG. 8) of the display device LCD is caused to blink, indicating that the camera has been changed over to the automatic speedchange mode.

Since the speed reduction ratio has been changed over to the low speed, the constant P2 for the speed reduction ratio for the low speed is set in the register RP, and the register RPP is initially set to the constant P2. Similarly, the constant M2 for the speed reduction ratio for the low speed is set in the register RM, and the register RMM is initially set to the constant M2.

Also, the register RD is initially set to the constant D.

Next, the flow returns to the step 108, and the aforesaid routine is executed.

Such a timer interrupt handling is always executed from the step 26 of the main routine to the step 12 of the next shooting. Thus, the film windup control is carried out accurately.

We return to the explanation of the main program routine.

Step 27:

Test the PF3 input connected to the first charge switch swCGE1. Wait for the turning-on of the first charge switch swCGE1 a little earlier than the completion of the charging, and then advance to a step 28.

Step 28:

Examine whether the content of the register RL is smaller than 2 or not less than 2, that is, the speed reduction ratio is for the high speed or for the low speed. When the speed reduction ratio for the high speed or for the low speed is in use, the flow advances to a step 29 or 30 respectively.

Step 29:

Because of the speed reduction ratio for the high speed, the charge motor M1 is cut off from the current supply, and braked. Since the charging runs at the high speed, if it were just at the completion of the charging that the charge motor M1 is braked, the inertia of the charge motor M1 would result in continuing its rotation and over-charging. To avoid this, the braking is applied a little earlier than the completion of the charging, so that the charge system stops in the accurately adjusted position when the charging is completed.

Step 30:

Wait for the arrival of a "0" signal from the second charge switch swCGE2 which signal represents the completion of charging of the shutter, mirror, automatic diaphragm and others. Then, advance to a step 31. Of course, the timer interrupt handling is carried out repeatedly during the time when the completion of charging is being waited for.

Step 31:

Change to PD0=PD1=1. Thereby, the charge motor M1 is cut off from the current supply and braked.

Note that in the steps 27 to 31, because, when the speed reduction ratio for the high speed is in use, the production of the stop signal for the charge motor M1 is started a little earlier than the completion of the charging, the distance the charge load overruns can be shortened.

Step 32:

Test the flag F0 representing the film end. Now assuming that the film does not end yet, the flow then advances to a step 33.

Step 33:

Examine whether or not the content of the register RL is 1, that is, the camera is set in the continuous shooting high speed mode. If so, jump to NEXT (step 3). From the step 3, as has been described above, the photographic sequence advances. What should be particularly pointed out here is that without certifying the approval of the film stop (flag F1=0) at the time of completion of the winding-up, current is allowed to flow to the first latch magnet MG0 in the step 9. That is, the closing-down of the diaphragm and the mirror-up which are not related directly to the actual exposure are made to operate regardless of the film stop for the completion of the winding-up. Thus, a speed-up is achieved. After that, the mirror-up is certified in the step 10, and the approval of the film stop at the time of the completion of the winding-up is certified in the step 12. Up to this time, the timer interruption repeats itself a reasonable number of times. If the film stop is approved when the winding-up is complete, advance to the next shutter opening control. If, upon arrival at the step 12, the film stop for the completion of the winding-up is not approved yet, the loop of the steps 11 and 12 is repeated, and the approval of the film stop in the timer interrupt handling is waited for. The foregoing is a routine of the continuous shooting high speed mode.

Step 34:

In the case of other modes than the continous shooting high speed mode, wait for the approval of the film stop when the winding-up is complete. (until the flag F1 becomes 0).

Step 35:

Test if the content of the register RL is 5, that is, the continuous shooting automatic speed-change mode. If so, jump to NEXT (step 3). If not, advance to a step 36.

Step 36:

Test if the content of the register RL is 2, that is, the continuous shooting low speed mode. If so, jump to NEXT. If not, advance to a step 37.

Step 37:

Test if the 4th bit of the register RL is 1, that is, the self-timer mode. If so, jump to NEXT. If not, advance to a step 38.

Step 38:

Test the PF7 input representing the state of the first stroke switch sw1. Upon waiting for the turning-off of the first stroke switch sw1, return to START. The coming to this step occurs when the single shooting high speed mode, or the single shooting automatic speed-change mode. Therefore, wait for the turning-off of the first stroke switch sw1, that is, the release of the release button from the depression.

In such a manner, when continuous shooting is carried out with the speed reduction ratio set in the low speed, unlike when the speed reduction ratio for the high speed is in use, it is after the film stop has been approved when the winding-up is complete that the next release sequence is made to start. This makes it possible to prohibit the camera from moving abnormally. That is, when the continuous shooting runs at the low speed, it takes a relatively long time to approve the film stop. Because of this, if the release sequence were made to start without certifying the approval of the film stop, the time from the completion of the mirror-up to the opening of the shutter would become too long. This would give the photographer an unpleasant impression. This can be avoided by the steps 34 to 36.

Next, we consider a situation that the film ends in the middle of the winding-up operation.

In this case, the timer interrupt handling results in F0=1, the flow branches from the step 32 to a step 39.

Step 39:

Change to PC0=0, PC1=1. Then, the rewind motor M3 is supplied with current through the drive circuit DR3. Thus, a rewinding is started.

Step 40:

Set a constant M3 in the register RM.

Step 41 to 48:

Similarly to the program for detecting the movement of the film described in connection with the steps 104 to 107 and 110 to 113 of FIG. 11, when the rewinding is complete, the first film switch swFLM1 no longer reverses ON-OFF. This fact is detected by the program of these steps 41 to 48. After the rewinding is complete, advance to a step 49.

Step 49:

Change to PC0=1, stopping the rotation of the rewind motor M3.

Step 50:

Reset the flag F0 representing the film end to 0.

Step 51:

Set the third bit of the register RL to 0. This implies that if the speed reduction ratio was automatically changed to the low speed, it is again automatically changed to the high speed when the rewinding is complete. This is because the photographer usually takes the initial setting at the single shooting high speed mode or continuous shooting high speed mode. When the camera is re-loaded, or when the external situation (particularly temperature) changes largely, the possibility will arise that the film is wound up at the high speed. So, the resetting of the camera to the initial mode is advantageous. After that, return to START.

Next, we consider a situation that during the taking of continuous shooting at the high speed, the charging of the shutter, mirror and automatic diaphragm is completed earlier than usual, but the winding-up is not yet complete, and that after the first latch magnet MG0 has been energized for the next exposure, the film ends.

In this case, since the mechanical release is actuated by the first latch magnet MG0, the diaphragm is closed down and the mirror moves upward. But, the film is stopped in the middle of the cycle of winding operation, and is tensioned as it is no more wound up, leaving the third film switch swFLM3 turned off. Therefore, if the film were rewound without any alteration of that condition, the photographer would mistake it for the shutter opening, and make an erroneous management. Also, if strong light is entering the lens, the film will be fogged. For this reason, it is better to move the mirror downward before the film is rewound.

After the mirror-up has been confirmed in the step 10, the film end is detected by the timer interrupt handling during the time when the approval of the film stop for the completion of the winding-up is waited for in the steps 11 and 12. In the step 132, the flag F0 is then set to 1. Therefore, at the step 11, the flow branches to a step 52.

Step 52:

By the change to PD0=1, PD1=0, the charge motor M1 is rotated in the direction in which the charge transmission system K1 is changed over to the low speed of the speed reduction ratio. The direction of rotation of the charge motor M1 may otherwise be made to change over depending on the preset mode. Then, jump to step 30. Upon confirmation of the completion of the charging, the program advances to steps 31, 32 and 39, entering the rewind control.

Mode Handling

Figure 10B:
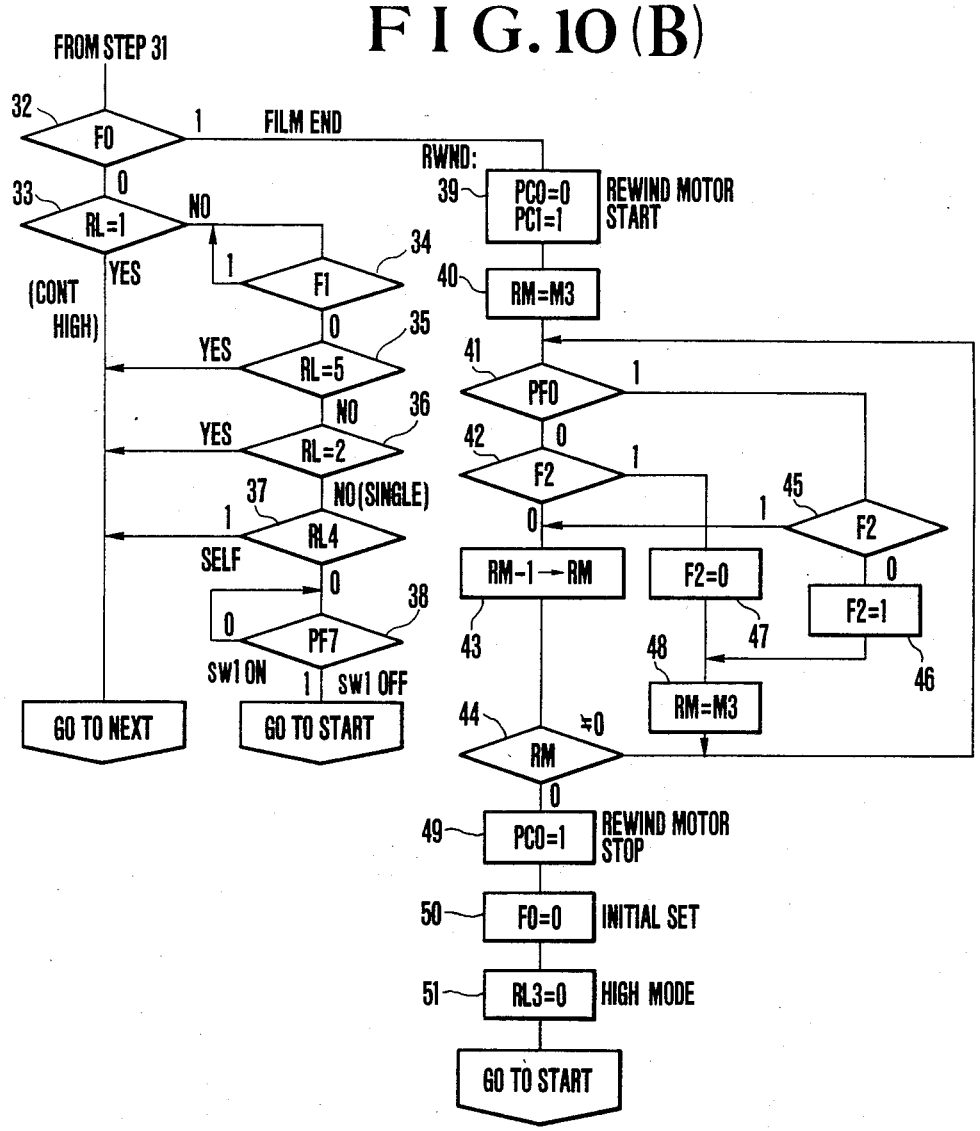
Figure 12:
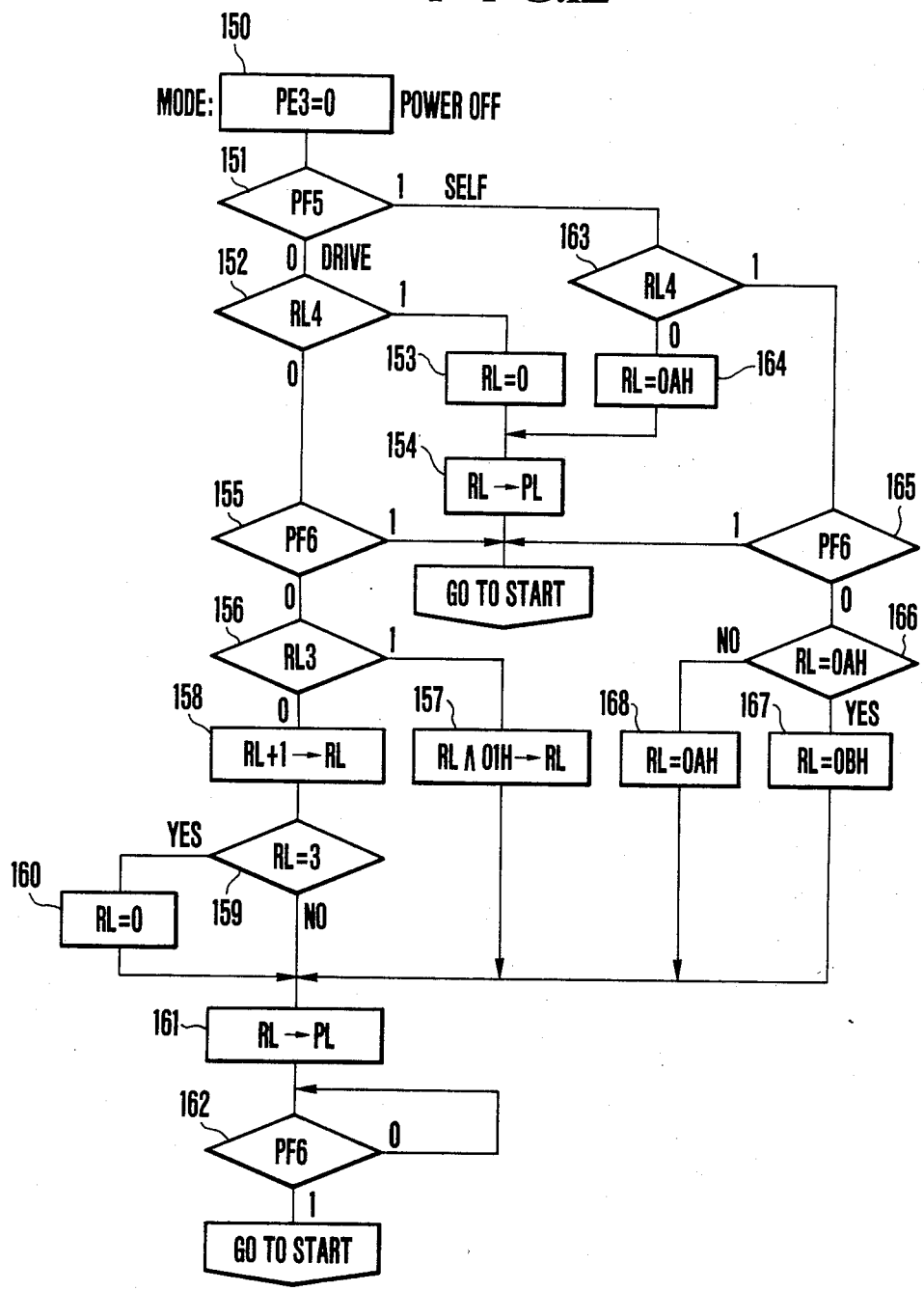

After the first stroke switch sw1 has been determined to be off in the step 1 of FIG. 10, the mode handling shown in FIG. 12 is carried out.

Step 150:

Change the output port PE3 to 0. Thereby the transistor TR1 (FIG. 6) is turned off, so that the electrical power source voltage Vcc is turned off. The light metering is stopped to save electrical energy. For note, the electrical power source voltage $V_{DD}$ is alive.

Step 151:

Test the PF5 input from the self-drive changeover switch swMODE. If it represents the drive mode, advance to a step 152. If the self-timer mode, advance to a step 163.

Step 152:

Test if the fourth bit of the register RL is 1. If so, because the self-timer mode has been set up to that time, advance to a step 153. If 0, because the drive mode has been set, advance to a step 155.

Step 153:

The coming to this step implies that the photographer has switched the self-drive changeover switch swMODE from the self-timer mode to the drive mode. Therefore, by setting the content of the register RL to 0, the first of the drive mode, or the single shooting high speed mode, is rendered operative.

Step 154:

The content of the register RL is outputted from the ports PL0 to PL3, and displayed on the device LCD. And, return to START.

Step 155:

Test the PF6 input from the selection switch swSTEP. When PF6=1, because this implies no changes in both of the self-drive changeover switch swMODE and the selection switch swSTEP, return to START. When PF6=0, because the selection switch swSTEP is being pushed, advance to a step 156.

Step 156:

Test if the third bit of the register RL is 1, or the changeover results in the automatic speed change. If the automatic speed changing is effected, advance to a step 157. If not so, advance to a step 158.

Step 157:

Compute "AND" of the content of the register RL and 1, and store its result again in the register RL. This means that the second, third and fourth bits are set to 0. Therefore, the automatic speed changing is released. To release the automatic speed changing manually, therefore, the photographer needs only to once push the selection switch swSTEP.

Step 158:

When the automatic speed changing is not effected, add 1 to the content of the register RL, and store the result again therein.

Step 159:

Test if the content of the register RL is 3. Since RL=3 is not assigned to any mode, the occurrence of 3 implies that all the drive modes are once cycled. If 3, advance to a step 160. If not 3, advance to a step 161.

Step 160:

Set the content of the register RL to 0.

The steps 158, 159 and 160 mean that the mode shifting: the single shooting high speed mode→the continuous shooting high speed mode→the continuous shooting low speed mode, is effected each time the selection switch swSTEP is pushed.

Step 161:

The content of the register RL is outputted from the ports PL0 to PL3, and displayed on the display device LCD.

Step 162:

Wait for the release of the selection switch swSTEP from the depression and then return to START.

Step 163:

Test if the fourth bit of the register RL is 1 even when the self-drive changeover switch swMODE is OFF. If 1, because, up to that time, the camera has been in the self-timer mode, advance to a step 165. If 0, because in the drive mode, advance to a step 164.

Step 164:

The coming to this step implies that the photographer has changed over the self-drive changeover switch swMODE from the drive mode to the self-timer mode. Therefore, the content of the register RL is set to 0AH in the hexadecimal number system, so that the first of the self-timer modes, or the 10 sec. mode, is rendered operative.

Step 165:

Test the PF6 input from the selection switch swSTEP. When PF6=1, because there is no change in both of the self-drive changeover switch swMODE and the selection switch swSTEP, return to START. When PF6=0, because the selection switch swSTEP is being pushed, advance to a step 166.

Step 166:

If the content of the register RL is 0AH, advance to a step 167. If not so, advance to a step 168.

Step 167:

Store a hexadecimal code 0BH representing 2 sec. mode of the self-timer in the register RL.

Step 168:

Store a hexadecimal code "0AH" representing the 10 sec. mode of the self-timer in the register RL.

The steps 166, 167 and 168 means that the self-timer mode is changed over between 10 sec. and 2 sec. each time the selection switch swSTEP is pushed.

Figure 13:
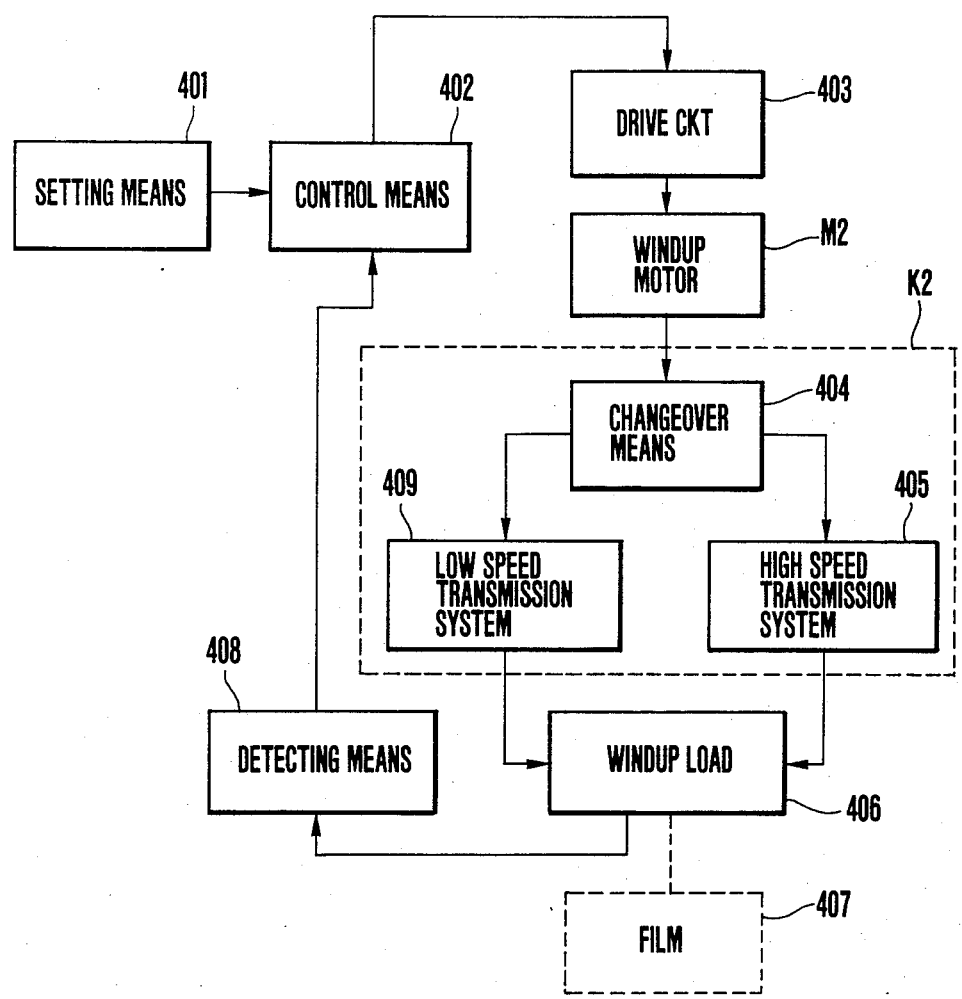
FIG. 13 is a block diagram taken to explain one aspect of the invention.
Figure 14:
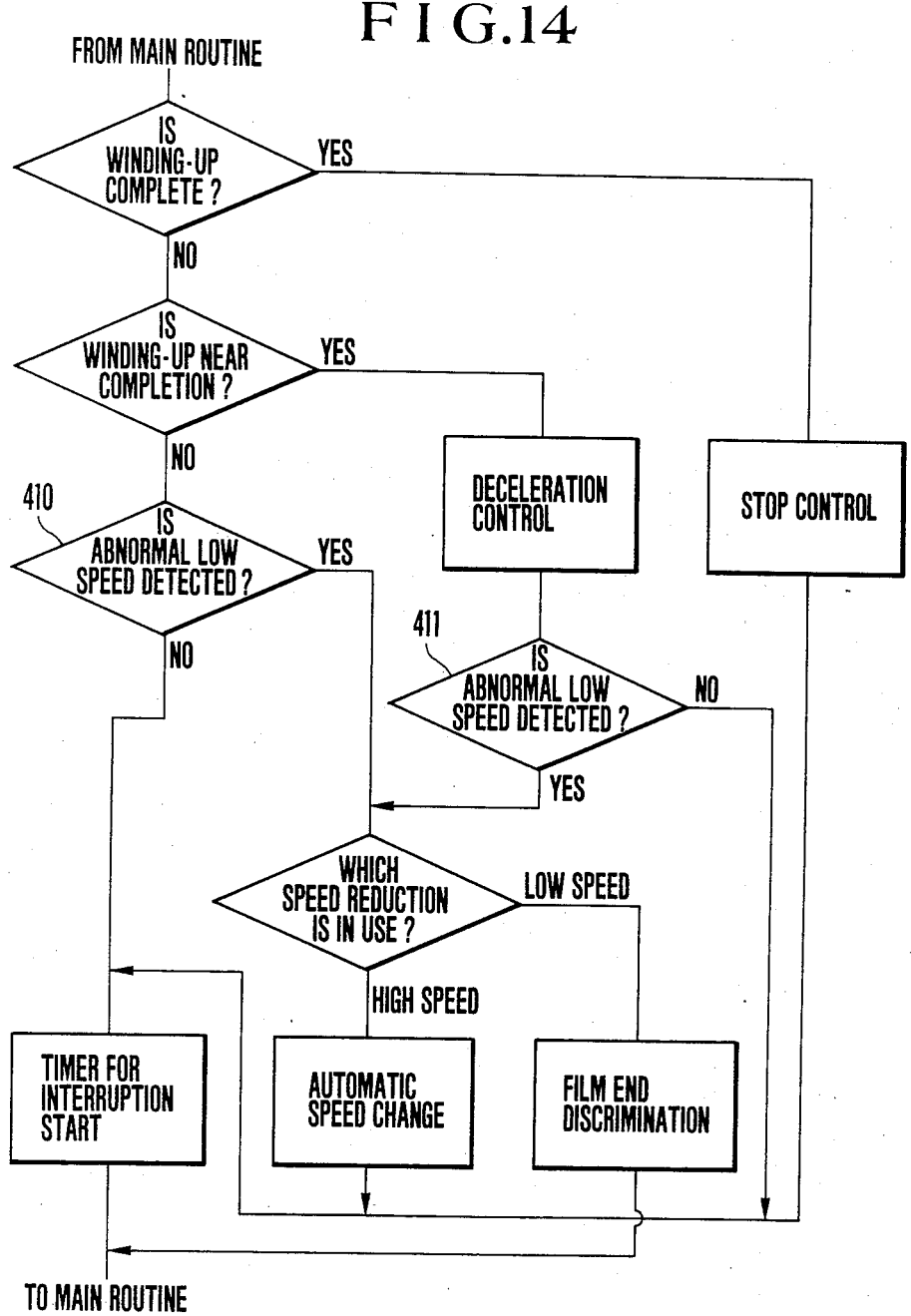
FIG. 14 is a flow chart illustrating part of the operation of FIG. 13.
Figure 15:
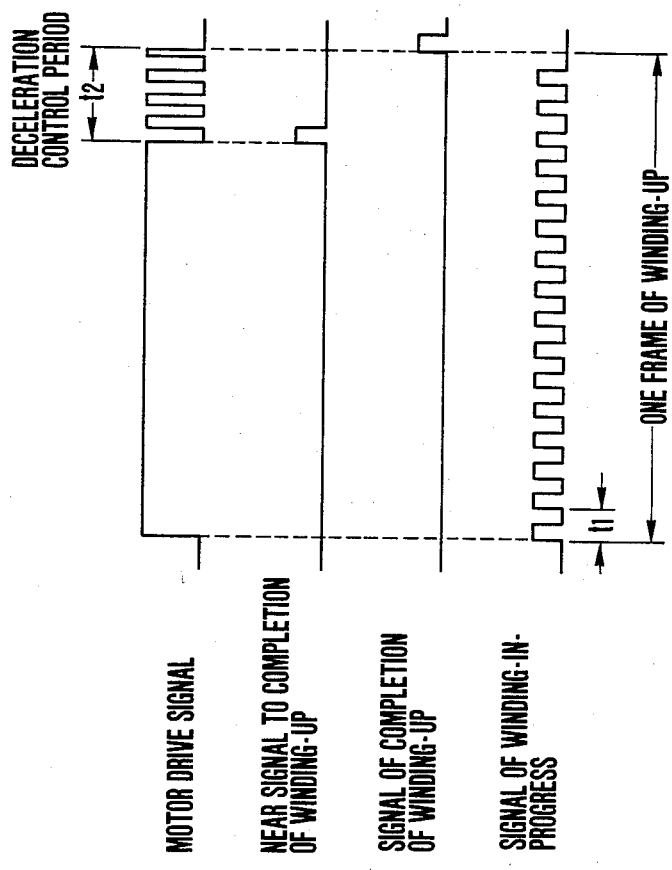
FIG. 15 is a time chart illustrating the signals in the various portion of FIG. 13.

FIGS. 13 to 15 are to explain one aspect of the invention. FIG. 13 is a block diagram taken to explain the operation. Setting means 401 is for setting the camera to one of modes, namely, a single-frame exposure mode in which the speed reduction ratio of the windup transmission system normally has a small value for the high speed, and is automatically changed from the small to a large value in response to lowering of the film winding-up speed, that is, a single shooting high speed mode, a continuous exposure mode in which the speed reduction ratio of the windup transmission system normally has the small value, and is automatically changed from the small to the large value in response to lowering of the film winding-up speed, that is, a continuous shooting high speed mode, and another continuous exposure mode in which the speed recuction ratio of the windup transmission system is fixed to the large value, that is, a continuous shooting low speed mode. Control means 402 performs control according to the preset mode.

In case when the camera is set in the single shooting high speed mode or the continuous shooting high speed mode, for the normal winding-up of film, the control means 402 comprising a microcomputer activates a drive circuit 403 to rotate the windup motor M2 to one direction (for example, normal direction), thereby changeover means 404 is operated to select a high speed transmission system 405 having the small speed recuction ratio. The driving torque of the windup motor M2 is transmitted through the high speed transmission system to a windup load 406 (including film 407). Thus, the film 407 is wound up at a relatively high speed.

As the windup load 406 becomes heavier, or the voltage of the electrical power source falls below the satisfactory operating level due to the exhaustion of the battery or a larger drop of the ambient temperature, detecting means 408 for detecting the rotation of the sprocket or the like produces an output signal. Responsive to this signal, the control means 402 determines that the film winding-up speed is abnormally low and then activates the drive circuit 403 to rotate the windup motor M2 to the other direction (for example, reversed direction). Thereby the changeover means 404 is operated to select a low speed transmission system having a large speed reduction ratio (automatic speed change).

The driving torque of the windup motor M2 is transmitted through a low speed transmission system 409 to the windup load 406. Thus, the film 407 is wound up at a relatively low speed.

When the arrival at a short time before the completion of the winding-up is detected by the detecting means 408, the control of deceleration of the windup motor M2 is performed by the control means 402. When the completion of the winding-up is detected by the detecting means 408, the control of stopping is performed. The abnormal low speed detection (including the film end), the automatic speed change, the deceleration control, the stopping control and the film end discrimination are performed by the timer interrupt handling. This is explained by reference to the flow chart of FIG. 14.

The timer interrupt handling is performed repeatedly in constant time intervals preset in the timer for the interruption when the main routine is interrupted. During the motor drive period that precedes the detection of the arrival at the short time before the completion of the winding-up, the abnormal low speed is detected by an abnormal low speed detecting process 410 having a relatively large number of steps. The abnormal low speed detecting process 410 is that, as shown in FIG. 15, whether or not the pulse period $t_1$ of a windup-in-progress signal comprising pulses produced for every constant angle of rotation of the sprocket exceeds the detection reference time is monitored, and its excess is determined to be the abnormal low speed. When this excess is not detected, the timer for the interruption is set again and the return to the main routine occurs. If the abnormal low speed is detected in the process of the abnormal low speed detecting process 410, the control means 402 then determines which value, small or large, the speed reduction ratio is taking. When the high speed mode is in operation, an automatic speed change of the speed reduction ratio from the small to the large value is performed. After that, the timer for interruption is started, and the return to the main routine occurs. When the low speed mode is in operation, the abnormal low speed is taken as the film end. Because there is no need to later perform the timer interrupt handling, the return to the main routine then occurs without having to start the timer for interruption.

In such a manner, it is during the motor drive period prior to the deceleration control period that because the timer interrupt handling contributes mainly to the performance of the abnormal low speed detecting process 410, even if the number of steps in the abnormal low speed detecting process 410 is made relatively large, one cycle of timer interrupt handing never takes a very long time. Also, the reference time for detection of the pulse period $t_1$ can be set in separation from the deceleration control period. This enables the changeover level of the automatic speed change to be made relatively high.

When the windup completion beforehandedness signal from the detecting means 408 enters, the control means 402 starts to control the deceleration of the windup motor M2 by changing the drive signal to the drive circuit 403 in duty fashion or by decreasing the level of the drive voltage. In sequence thereto, another abnormal low speed detecting process 411 which has a realtively small number of steps starts to operate. This abnormal low speed detecting process 411 is that, as shown in FIG. 15, whether or not the total time $t_2$ of the entire deceleration control period exceeds a detection reference time is monitored, and the detection of its excess is determined that the abnormal low speed has occurred. By this abnormal low speed detection, the control means 402 performs automatic change of the speed of the windup transmission system K2 with the change of the speed reduction ratio to the large value for the low speed. Then, whether or not the abnormal low speed has occurred is tested again.

In such a manner, the deceleration control and the abnormal low speed detecting process 411 are performed time-serially. But by using that abnormal low speed detecting process 411 which has the relatively small number of steps, the time necessary to do one cycle of the timer interrupt handling in the deceleration control period can be made relatively short. Therefore, the return to the main routine occurs earlier with an advantage that the control of the other systems by the main routine can be started without delay.

When the windup completion signal from the detecting means 408 enters, the control means 402 produces a stop signal for the windup motor M2, controlling its stopping.

For note, though the changeover means 404, the high speed transmission system 405 and the low speed transmission system 409 constitute the windup transmission system K2, the high and low speed transmission systems 405 and 409 may otherwise be constructed with a common part of speed reduction gear train. For the case of this alternative, the changeover means 404 should be changed to the form of being inserted in the middle of the transmission systems 405 and 409.

Even when in the continuous shooting low speed mode, the use of both abnormal low speed detecting processes 410 and 411 for performing the detection of the abnormal low speed is the same.

Figure 16:
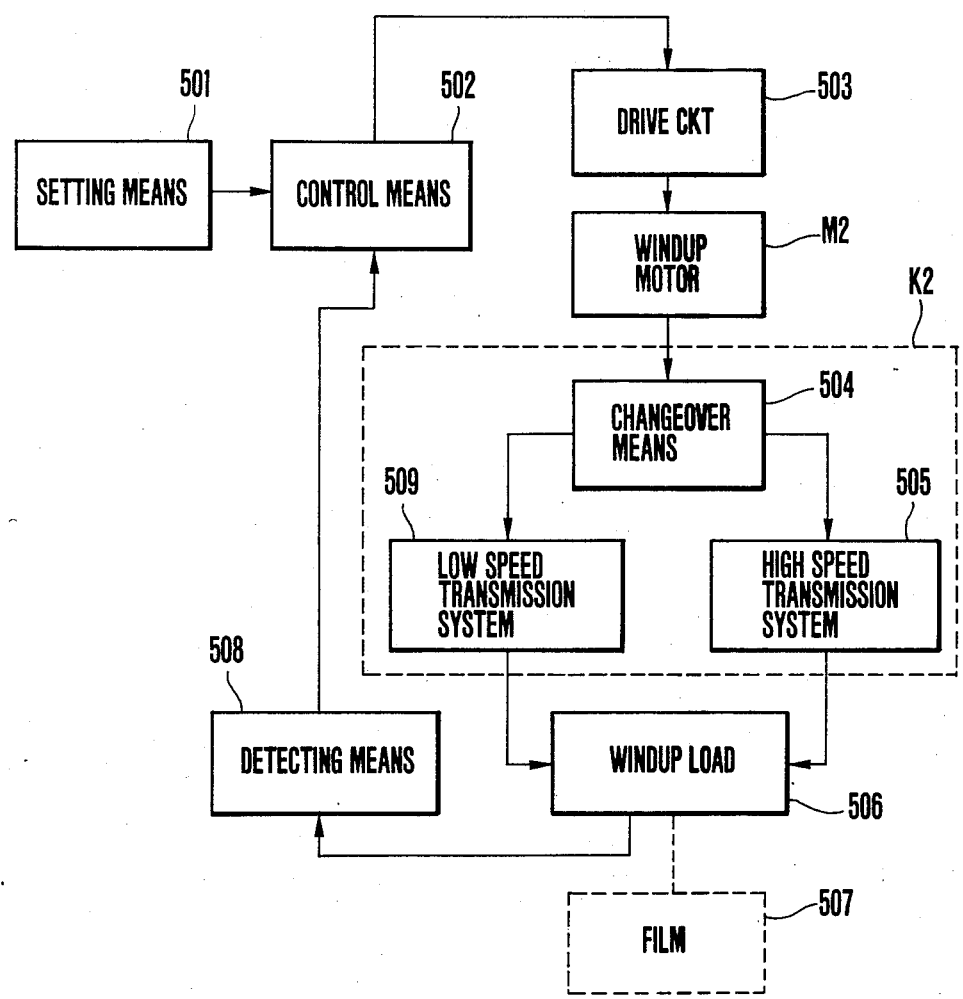
FIG. 16 is a block diagram taken to explain another aspect of the invention.

Another aspect of the invention is explained by reference to FIGS. 16 to 18. FIG. 16 is a block diagram taken to explain the operation.

The single shooting high speed mode in which the speed reduction ratio of the windup transmission system normally has a small value for a high speed, and is automatically changed from the small to a large value for a low speed in response to lowering of the film winding-up speed, the continuous shooting high speed mode in which the speed reduction ratio of the windup transmission system normally has the small value and is automatically changed from the small to the large value in response to lowering of the winding-up speed of the film, and the continuous shooting low speed mode in which the speed reduction ratio of the windup transmission system is fixed to the large value, are selectively set in the camera by setting means 501. Control means 502 performs control according to the preset mode.

In case when the camera is set in the single shooting high speed mode or the continuous shooting high speed mode, the control means 502 comprising a microcomputer activates a drive circuit 503 to rotate the windup motor M2 to one direction (for example, normal direction) thereby changeover means 504 is operated to select a high speed transmission system 505 having the small speed reduction ratio. The driving torque of the motor M2 is transmitted through the high speed transmission system 505 to a windup load 506 including film 507. Thus, the film 507 is wound up at a relatively high speed.

As the windup load 506 becomes heavier, or the voltage of the electrical power source falls below the satisfactory operating level due to the exhaustion of the battery or due to a large drop of the ambient temperature, detecting means 508 for detecting the rotation of the sprocket or the like produces an output signal. When the control means 502 determines that this signal represents the occurrence of an abnormal low speed, it activates the drive circuit 503 to rotate the windup motor M2 to the other direction (for example, reverse direction). Thereby the changeover means 504 is operated to select a low speed transmission system 509 having the large speed reduction ratio. (automatic speed change). The driving torque of the windup motor M2 is transmitted through the low speed transmission system 509 to the windup load 506. Thus, the film 507 is wound up at a relatively low speed.

When the windup completion beforehandedness is detected by the detecting means 508, the control means 502 starts to control the deceleration of the windup motor M2 by the changing the drive signal to the drive circuit 503 in duty fashion or by decreasing the level of the drive voltage. When the completion of the winding-up is detected by the detecting means 508, the control means 502 produces the stop signal for the windup motor M2, controlling its stopping.

Figure 17:
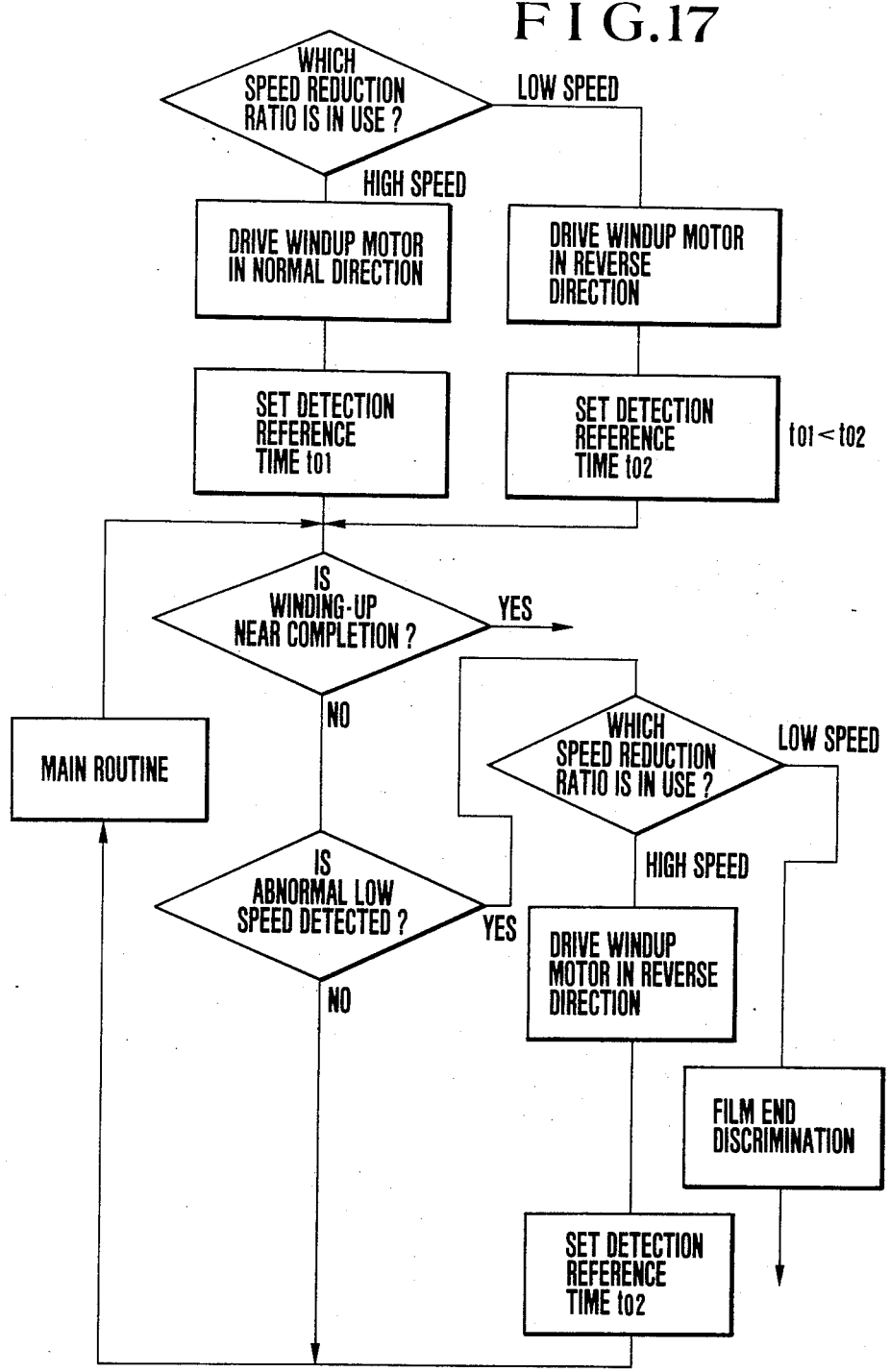
FIG. 17 is a flow chart illustrating part of the operation of FIG. 16.

We explain about the detection of the abnormal low speed (including the film end) in detail by reference to the flow chart of FIG. 17 and the time chart of FIG. 18.

When the camera is set in the single shooting high speed mode or the continuous shooting high speed mode, the windup motor M2 is driven to the normal direction thereby the speed reduction ratio of the windup transmission system K2 is changed to the large value. In operative connection with this, the reference time for the detection of the abnormal low speed is set to a value $t_{01}$ for the small speed reduction ratio. When the camera is set in the continuous shooting low speed mode, the windup motor M2 is rotated to the reverse direction, thereby the speed reduction ratio of the windup transmission system K2 is set to the large value. In operative connection with this, the reference time for the detection of the abnormal low speed is set to another value $t_{02}$ for the large speed reduction ratio. The former value $t_{01}$ is determined to be shorter than the latter value $t_{02}$. Next, the abnormal low speed detecting process follows. This abnormal low speed detecting process is performed by the timer interrupt handling until the arrival at the short time before the completion of winding-up of the film is detected. The timer interrupt handling is repeatedly executed in constant time invervals preset in the timer for interruption when the main routine is interrupted. As shown in FIG. 18, whether or not the pulse period $t_1$ of a windup-in-progress signal comprising pulses produced for every constant angle of rotation of the sprocket exceeds the detection reference time $t_{01}$ when in the high speed mode is monitored, and the abnormal low speed is detected by the fact that it has exceeded. When this excess is not detected, the timer for interruption (not shown) is set again, and then the return to the main routine occurs. When the abnormal low speed is detected in the abnormal low speed detecting process, the control means 502 determines which value, small and large, the speed reduction ratio is taking. When in the high speed mode, the windup motor M2 is driven to the reverse direction, thereby the speed reduction ratio is changed to the large value, and at the same time the detection reference time is altered to the value $t_{02}$ for the large speed reduction ratio. After that, the timer for interruption is started and the procedure returns to the main routine. When in the low speed mode, the abnormal low speed is discriminated as the film end, because, after that, there is no need to perform the timer interrupt handling, the precedure returns to the main routine without having to start the timer for interruption.

Such an abnormal low speed detecting process is repeated until the arrival at the short time before the completion of the winding-up is detected.

During the deceleration control period that follows the detection of the arrival at the short time before the completion of winding-up, the abnormal low speed is detected by the other abnormal low speed detecting process.

In such a manner, the different values $t_{01}$ and $t_{02}$ of the detection reference time are assigned to the respective different values of the speed reduction ratio. Therefore, the winding-up speed of the film can be differentiated between when in the high speed mode and when in the low speed mode with an advantage that the automatic speed change can be carried out with high efficiency. For example, the value $t_{01}$ of the detection reference time is made to correspond to a film winding-up speed of 3 frames/sec. and the other value $t_{02}$ is made to correspond to another film winding-up speed of 1 frame/sec. Then, the range of film winding-up speeds when in the high speed mode can be made to be 4 to 3 frames/sec. and that of film winding-up speed when in the low speed to be 2 to 1 frame/sec.

Also, a common detection timer can reasonably be used for the automatic speed change and the discrimination of the film end.

For note, though the changeover means 504, the high speed transmission system 505 and the low speed transmission system 509 constitute the windup transmission system K2, the high and low speed transmission systems 505 and 509 may otherwise be constructed with a common part of speed reduction gear train. For the case of this alternative, the changeover means 504 should be changed to the form of being inserted in the middle of the transmission systems 505 and 509.

In the above-described embodiments shown in FIGS. 1 to 13, the changing-over of the speed reduction ratio of the windup transmission system K2 is performed by changing the direction of rotation of the windup motor M2. But, this may otherwise be performed by using a magnet. Also though the number of values the speed reduction ratio can take selectively is two, this number may be increased to three or more. Further, as the detection reference level, use is made of the time values $t_{01}$ and $t_{02}$. But, when the pulse period $t_1$ of the windup-in-progress signal is short, the number of reference pulses per unit time may otherwise be used as the detection reference level.

Also though the above-described embodiments are applied to the type of camera in which the abnormal low speed detection is performed concerning the windup motor M2, they are applicable to other cases concerning the charge motor or a motor which alone drives the winding-up, rewinding and charging.

What is claimed is:

1. A motorized drive device for a camera comprising:
   (a) a motor as a rotation drive source;
   (b) a transmission system to be driven by said motor;
   (c) a camera mechanism to be driven by the output of said transmission system;
   (d) control means for controlling the rotation of said motor by current supply, said control means controlling the current supply in such a manner that said motor rotates at least at a first speed and a second speed which is slower than said first speed; and (e) low speed abnormal detecting means for detecting a state that the speed of rotation of said motor is slower than a prescribed reference speed, said detecting means having set therein a first reference speed when the current supply is controlled to said first speed of rotation, and a second reference speed when the current supply is controlled to said second speed of rotation, and said first reference speed being made faster than said second reference speed.

2. A camera according to claim 1, wherein as said camera mechanism, an advancing structure for film is used.

3. A camera according to claim 1, wherein said control means achieves said first speed rotation by giving a continuous current supply to said motor, and achieves said second speed of rotation by giving duty pulses (intermittent pulses) to said motor.

4. A camera according to claim 1, wherein said low speed abnormal detecting means detects the low speed abnormal state when the time an object to be driven by the rotation of said motor takes to move from a first position to a second position is longer than a preset reference time.

5. A camera according to claim 2, wherein said low speed abnormal detecting means includes pulse generating means for producing a pulse signal representing the amount of movement of the film advanced by said advancing structure, and the state that the speed of rotation of said motor is slower than said reference speed is detected when said pulse signal is not produced within a preset prescribed time.

6. A camera according to claim 2, wherein said control means controls the current supply for one-frame winding-up advance of the film in such a manner that said motor first rotates at said first speed and then at said second speed.

7. A motorized drive device for a camera comprising:
(a) a motor as a rotation drive source;
(b) a transmission system to be driven by said motor, said transmission system having set therein at least a high speed transmission system having a small speed reduction ratio and a low speed transmission system having a large speed reduction ratio;
(c) a camera mechanism to be driven by the output of said transmission system;
(d) control means for changing over between the speed reduction ratios of said transmission system; and
(e) low speed abnormal detecting means for detecting a state that the speed of rotation of said motor is slower than a preset reference speed, said detecting means having set therein a first reference speed when said transmission system is set in said high speed transmission system by said control means, and a second reference speed when said transmission system is set in said low speed transmission system, said first reference speed being made faster than said second reference speed.

8. A camera according to claim 7, wherein the changeover of the speed reduction ratio of said transmission system uses a planetary clutch whose output connection is selected by the change of the direction of rotation of said motor.

9. A camera according to claim 7, wherein as said camera mechanism, an advancing structure for film is used.

10. A camera according to claim 7, wherein said low speed abnormal detecting means detects the low speed abnormal state when the time an object to be driven by the rotation of said motor takes to move from a first position to a second position is longer than a preset reference time.

11. A camera according to claim 9, wherein said low speed abnormal detecting means includes pulse generating means for producing a pulse signal representing the amount of movement of the film advanced by said advancing structure, and the state that the speed of rotation of said motor is slower than said reference speed is detected when said pulse signal is not produced within a preset prescribed time.

12. A camera according to claim 7, further comprising second control means for automatically changing the speed reduction ratio of said transmission system from said high speed transmission system to said low speed transmission system, said second control means automatically changing said speed reduction ratio of said transmission system when the fact that the speed of rotation of said motor is slower than the first reference speed is detected by said low speed abnormal detecting means.

* * * * *